US006819351B2

United States Patent
O'Hara et al.

(10) Patent No.: US 6,819,351 B2
(45) Date of Patent: Nov. 16, 2004

(54) COARSE AND FINE ELECTRONIC BOW CORRECTION FOR A WRITER

(75) Inventors: Shawn E. O'Hara, Rochester, NY (US); William L. Chapman, Hemlock, NY (US); Yee S. Ng, Fairport, NY (US)

(73) Assignee: NexPress Solutions LLC, Rochester, NY (US)

( * ) Notice: Subject to any disclaimer, the term of this patent is extended or adjusted under 35 U.S.C. 154(b) by 45 days.

(21) Appl. No.: 09/870,305

(22) Filed: May 30, 2001

(65) Prior Publication Data

US 2002/0191068 A1 Dec. 19, 2002

(51) Int. Cl.[7] .............................. B41J 2/435; B41J 2/47
(52) U.S. Cl. ..................................................... 347/237
(58) Field of Search ................................ 347/132, 168, 347/211, 237, 238, 247, 256

(56) References Cited

U.S. PATENT DOCUMENTS 5,585,836 A   12/1996   Pham et al. ................. 347/237

Primary Examiner—Michael Nghiem

(57) ABSTRACT

Increasing the linearity of elements within a printhead by applying a coarse electronic adjustment to rearrange the electronic printing of data into the proper pixel line and then applying a fine electronic adjustment to reduce the bow error to fraction of a pixel line. Delays of exposure control signals are used by the fine electronic adjustment to correct linearity by a fraction of a pixel line. The delays can be repeated to multiply the number of delays available and increase the linearity resolution. The delays can also be averaged between odd and even rows of elements to increase apparent resolution.

16 Claims, 34 Drawing Sheets

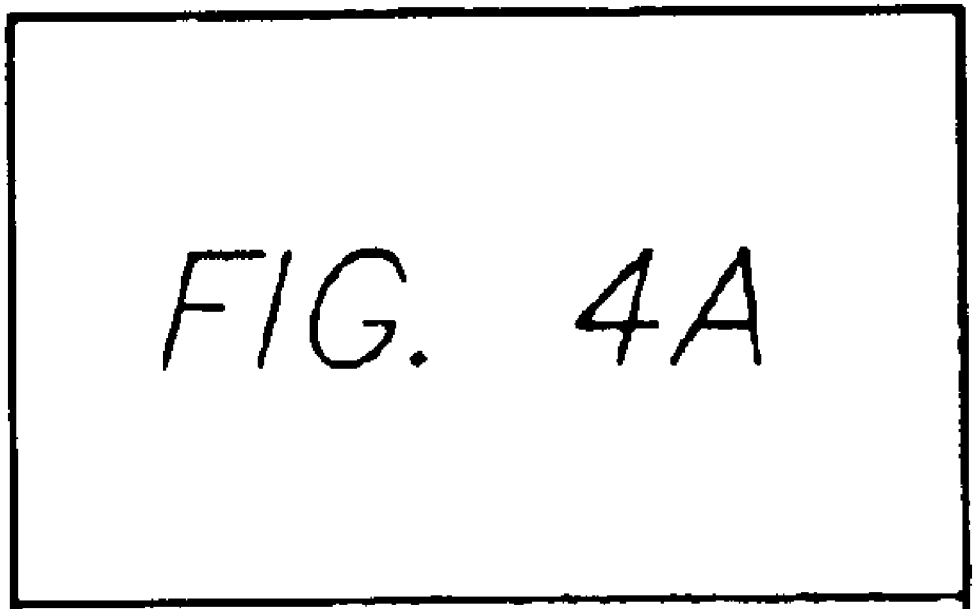
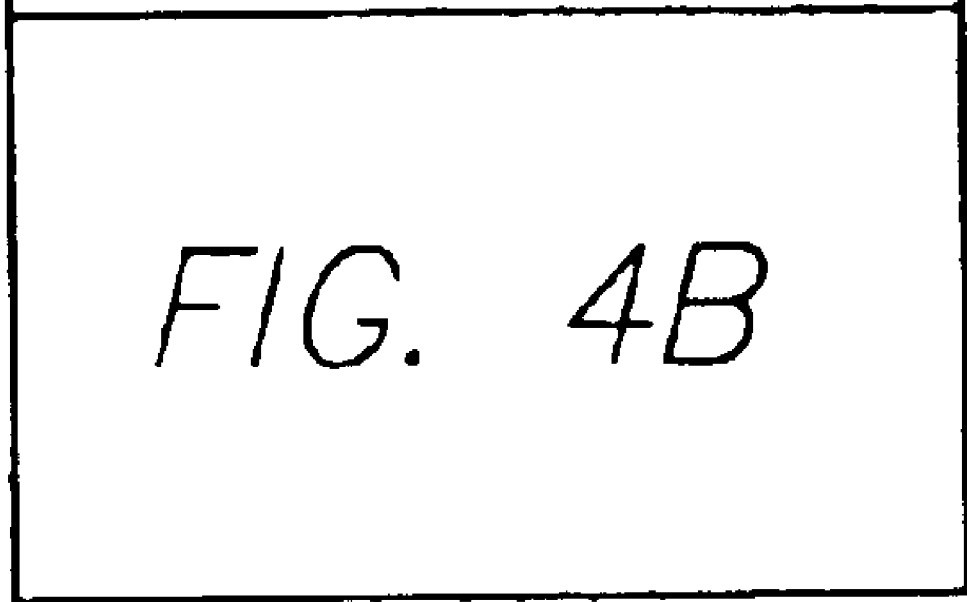
FIG. 4

| | IMAGE DATA LINE 1 | IMAGE DATA LINE 2 | IMAGE DATA LINE 3 | IMAGE DATA LINE 4 | ..... | IMAGE DATA LINE 49 | IMAGE DATA LINE 50 | ..... | CEPA VALUE REGISTER |
|---|---|---|---|---|---|---|---|---|---|
| ELEMENT S | S1 | S2 | S3 | S4 | ..... | 49 | 50 | ..... | 0 |
| ELEMENT R | R1 | R2 | R3 | R4 | ..... | 49 | 50 | ..... | 1 |
| ELEMENT Q | Q1 | Q2 | Q3 | Q4 | ..... | 49 | 50 | ..... | 2 |
| ELEMENT P | P1 | P2 | P3 | P4 | ..... | 49 | 50 | ..... | 2 |
| ELEMENT O | O1 | O2 | O3 | O4 | ..... | 49 | 50 | ..... | 3 |
| ELEMENT N | N1 | N2 | N3 | N4 | ..... | 49 | 50 | ..... | 3 |
| ELEMENT M | M1 | M2 | M3 | M4 | ..... | 49 | 50 | ..... | 0 |
| ELEMENT L | L1 | L2 | L3 | L4 | ..... | 49 | 50 | ..... | 1 |
| ELEMENT K | K1 | K2 | K3 | K4 | ..... | 49 | 50 | ..... | 2 |
| ELEMENT J | J1 | J2 | J3 | J4 | ..... | 49 | 50 | ..... | 1 |
| ELEMENT I | I1 | I2 | I3 | I4 | ..... | 49 | 50 | ..... | 0 |
| ELEMENT H | H1 | H2 | H3 | H4 | ..... | 49 | 50 | ..... | 1 |
| ELEMENT G | G1 | G2 | G3 | G4 | ..... | 49 | 50 | ..... | 2 |
| ELEMENT F | F1 | F2 | F3 | F4 | ..... | 49 | 50 | ..... | 2 |
| ELEMENT E | E1 | E2 | E3 | E4 | ..... | 49 | 50 | ..... | 3 |
| ELEMENT D | D1 | D2 | D3 | D4 | ..... | 49 | 50 | ..... | 2 |
| ELEMENT C | C1 | C2 | C3 | C4 | ..... | 49 | 50 | ..... | 3 |
| ELEMENT B | B1 | B2 | B3 | B4 | ..... | 49 | 50 | ..... | 3 |
| ELEMENT A | A1 | A2 | A3 | A4 | ..... | 49 | 50 | ..... | 3 |

EG. 50 IT LINE IMAGE

EG. 2-BIT CEPA
$(m=2)$ #STEPS=$2^m$
STEPS=4

FIG. 4A

EG. CEPA OUTPUT IT LENGTH $+(2^m-1)$ 50 + 3=53 53 IT LINE IMAGE

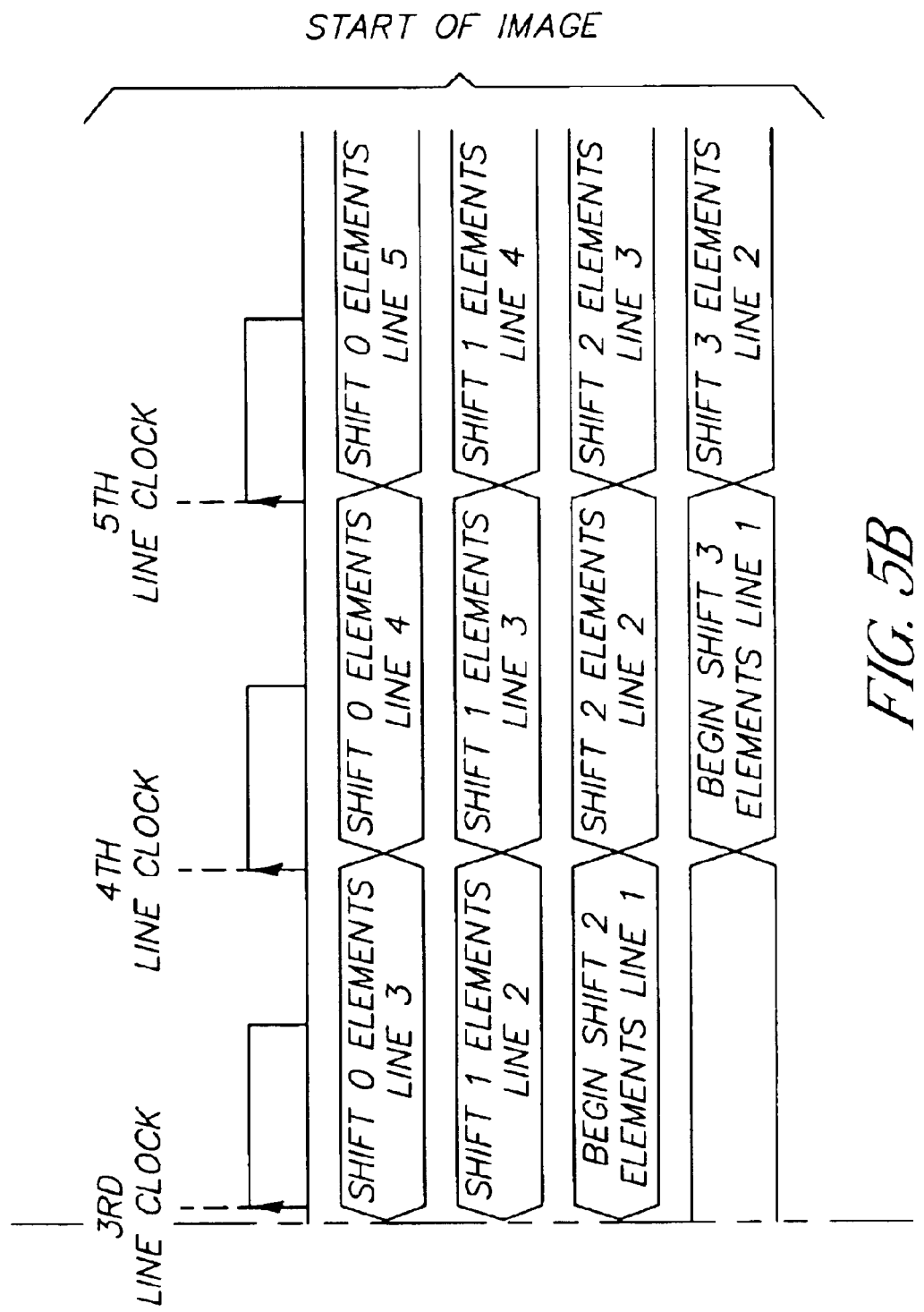

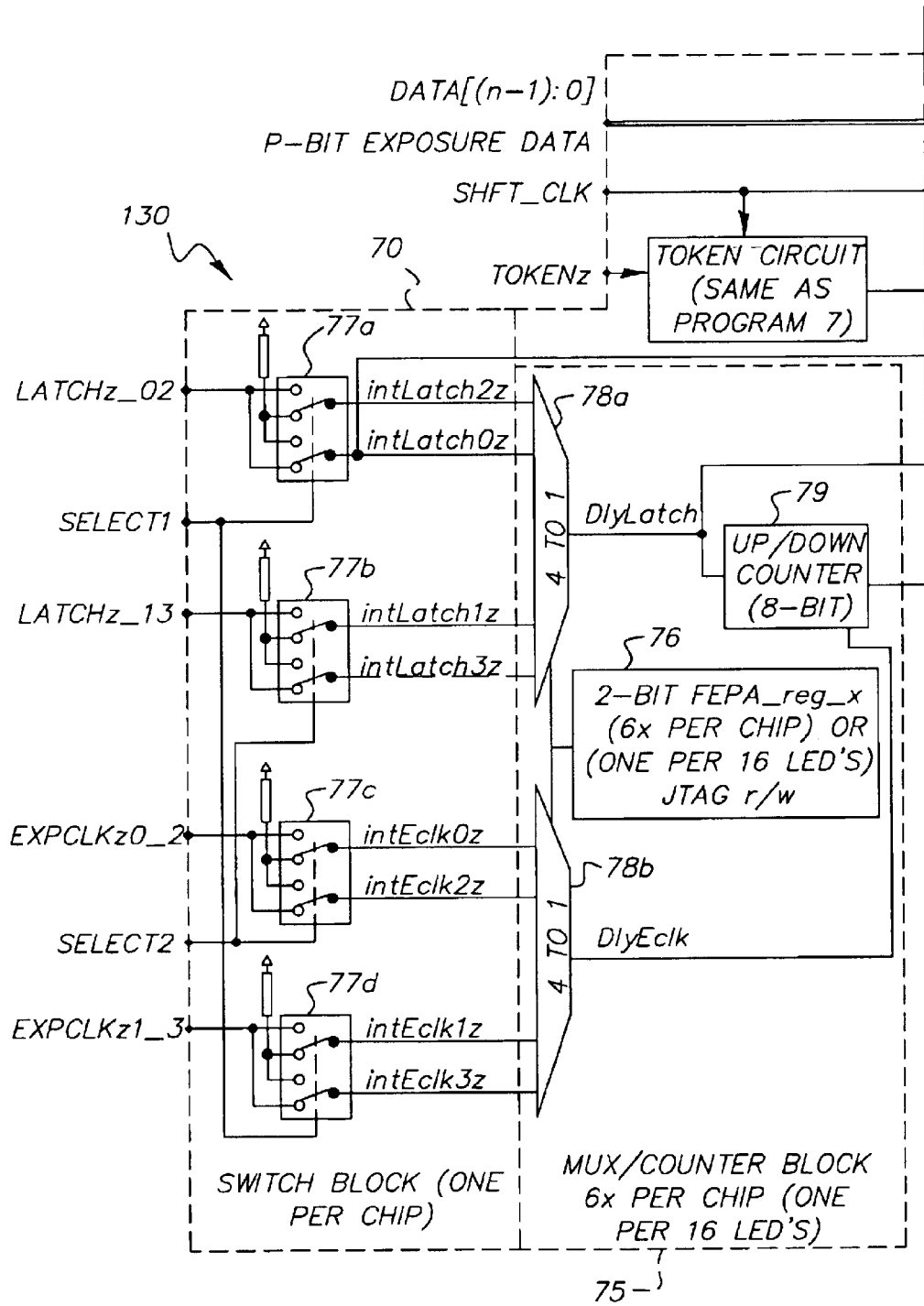
FIG. 8B1

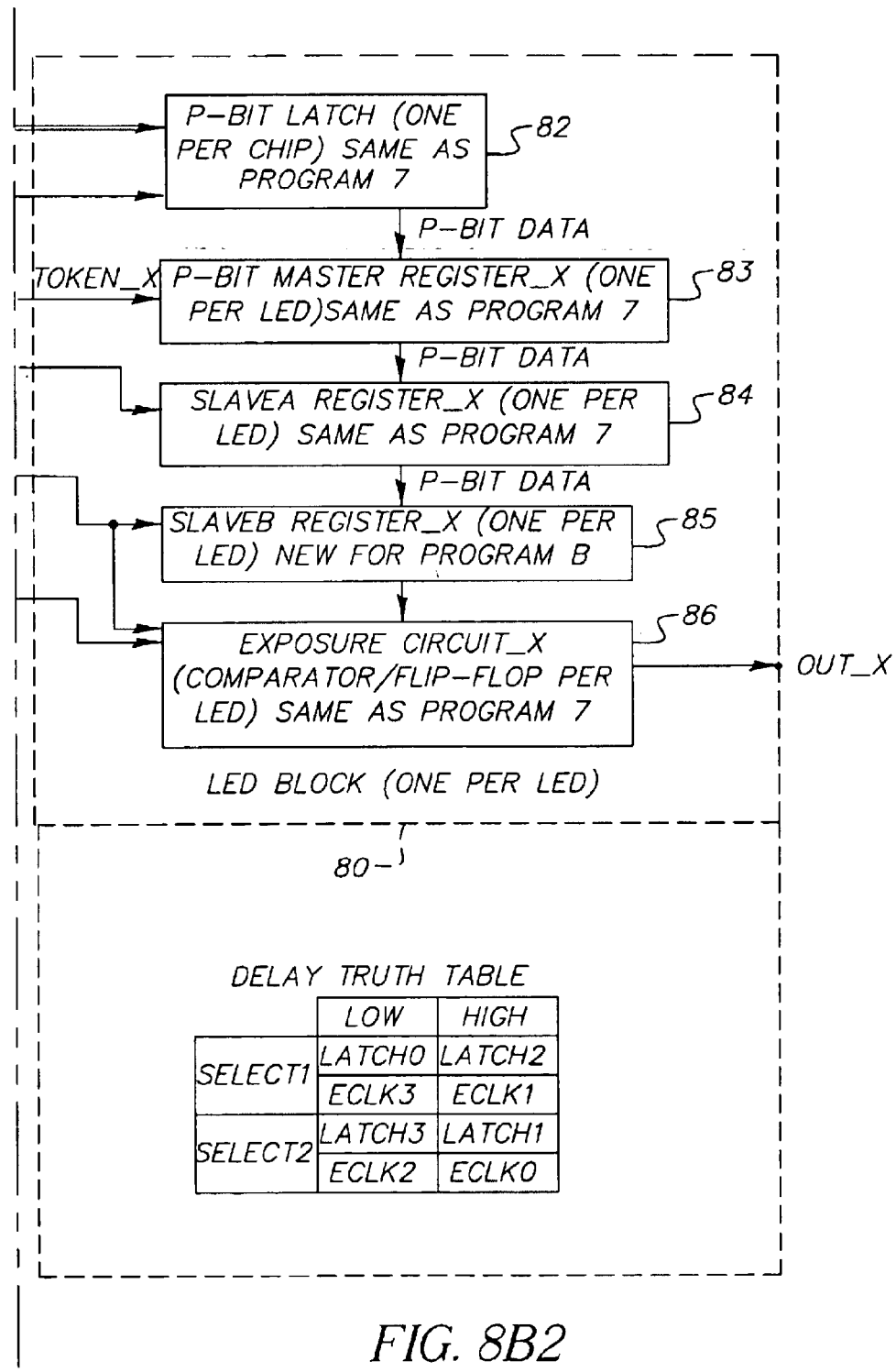
FIG. 8B2

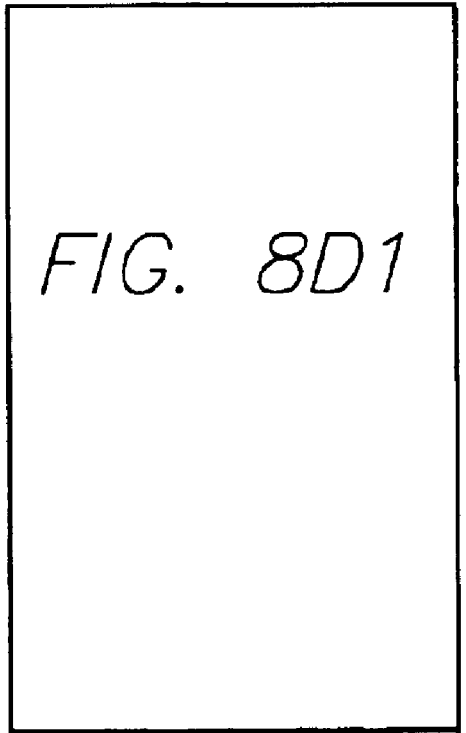
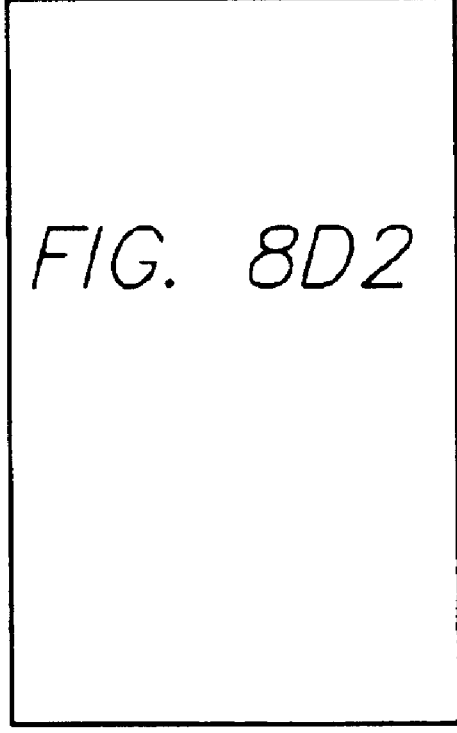
*FIG. 8D*

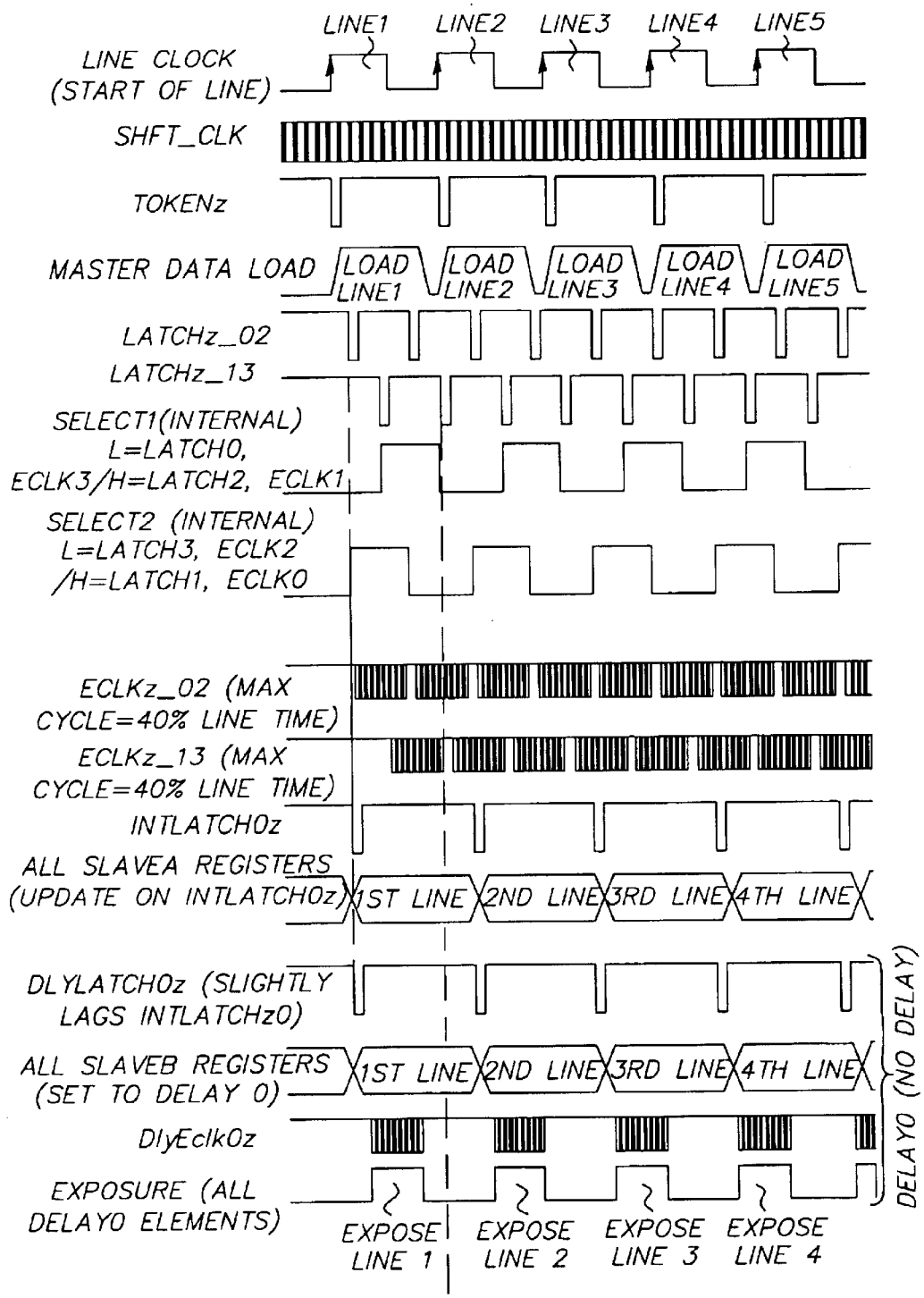
FIG. 8D1

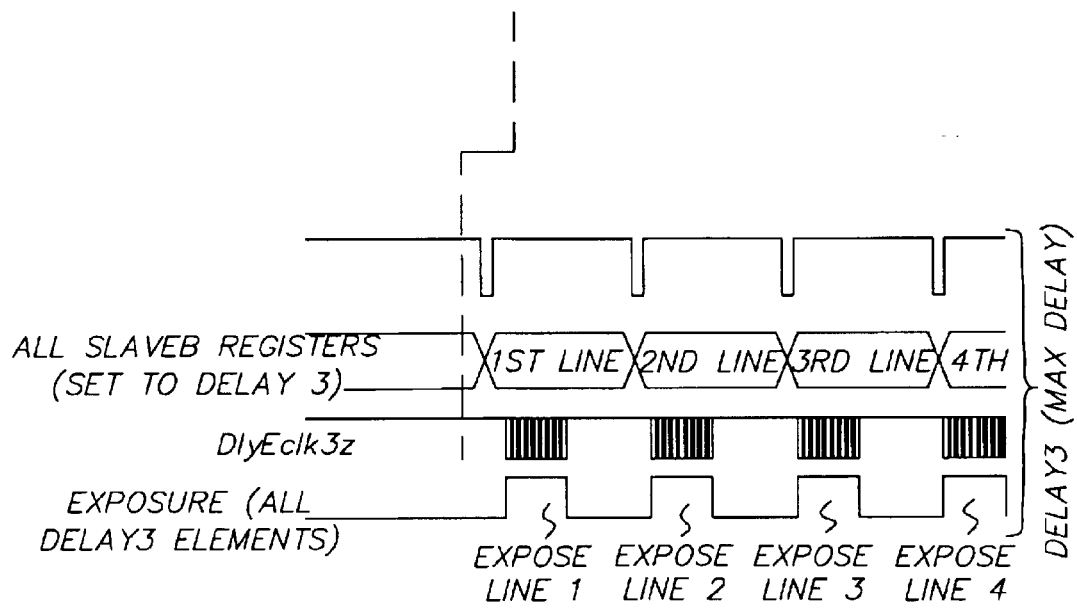
FIG. 8D2

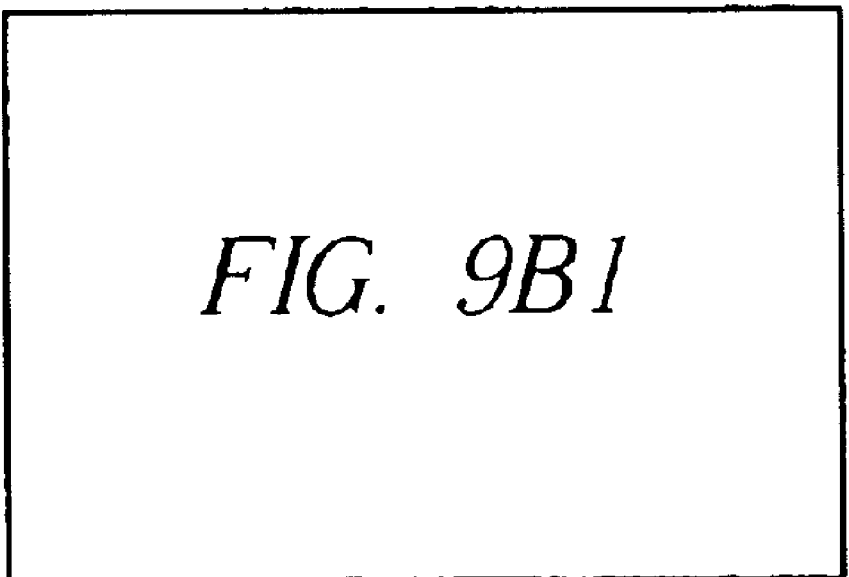
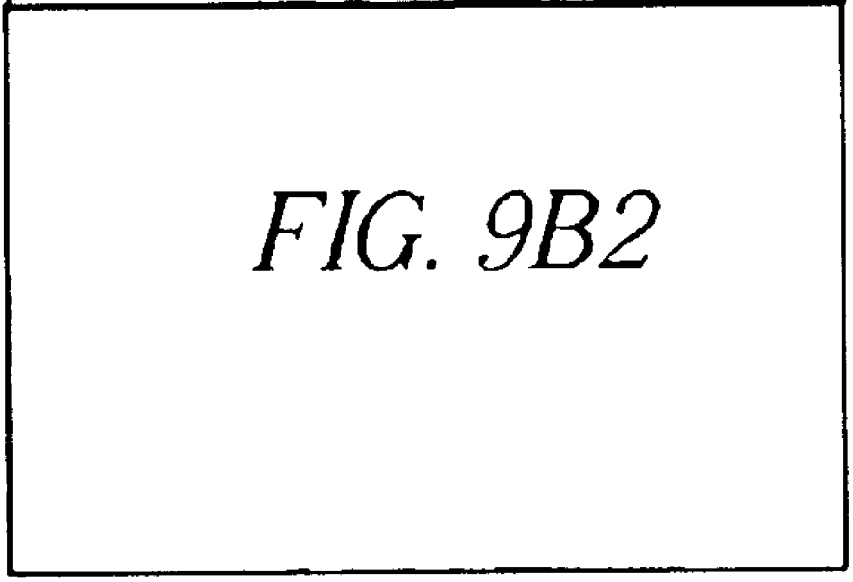
FIG. 9B

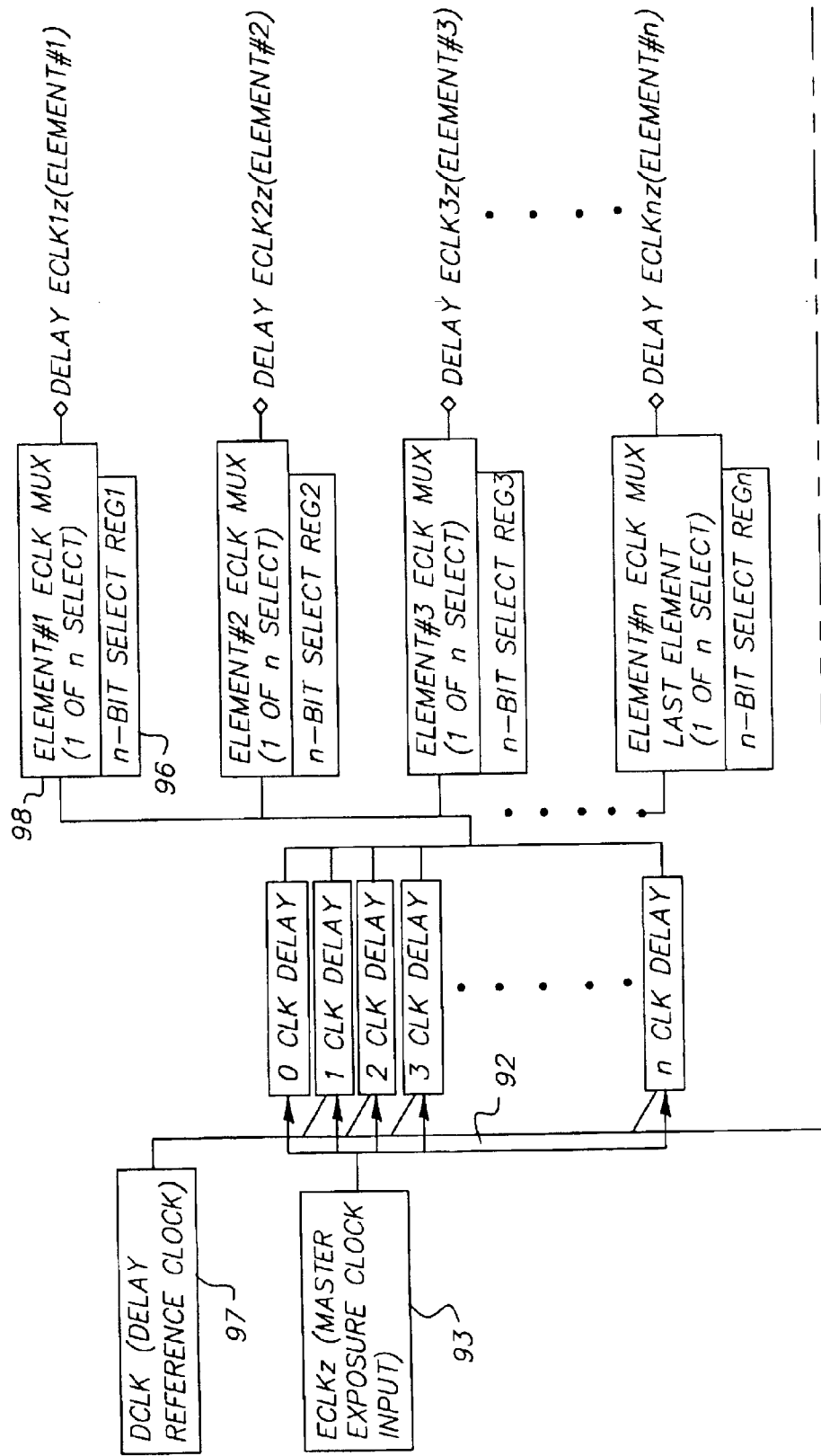
FIG. 9B1

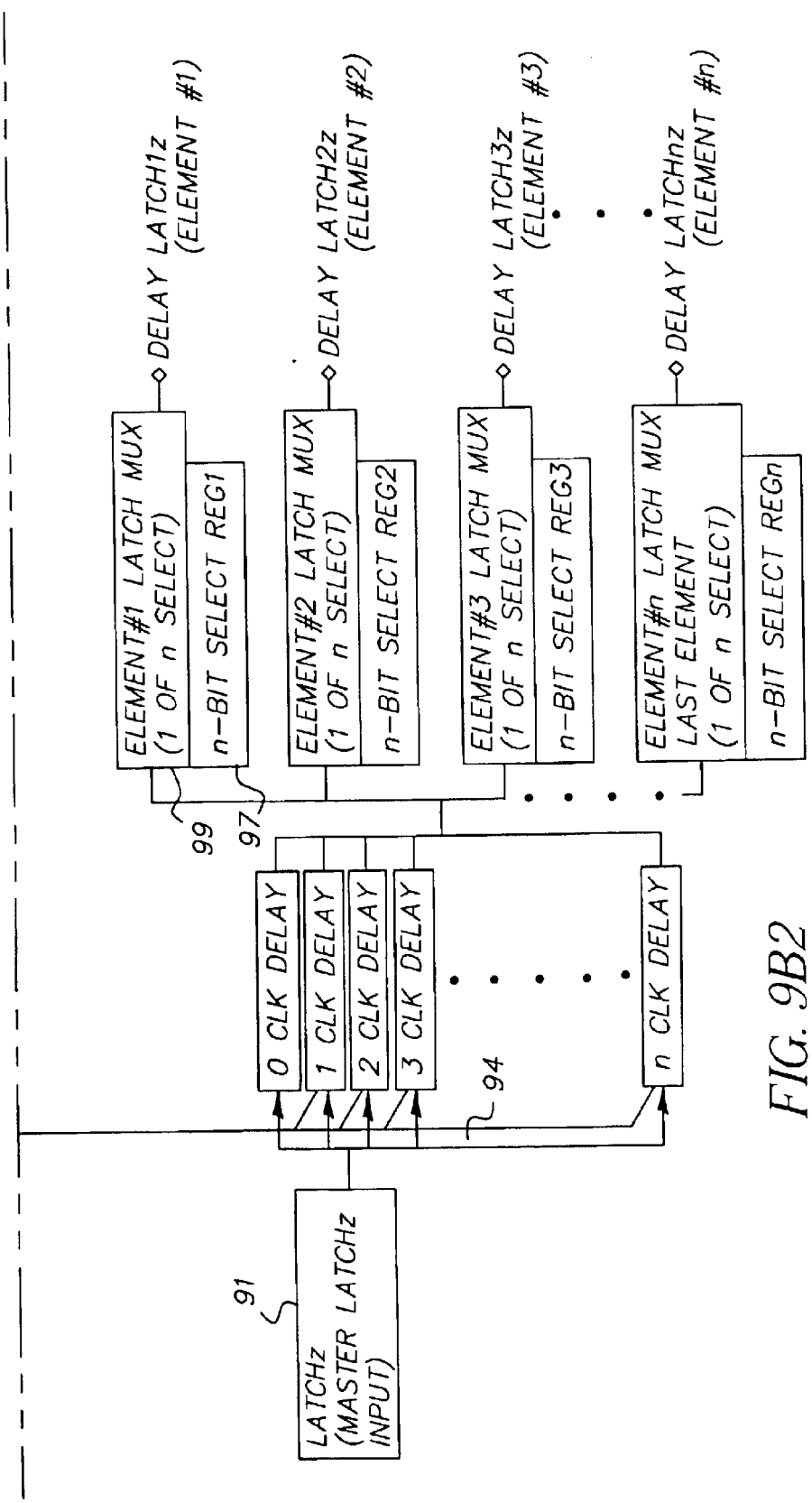
FIG. 9B2

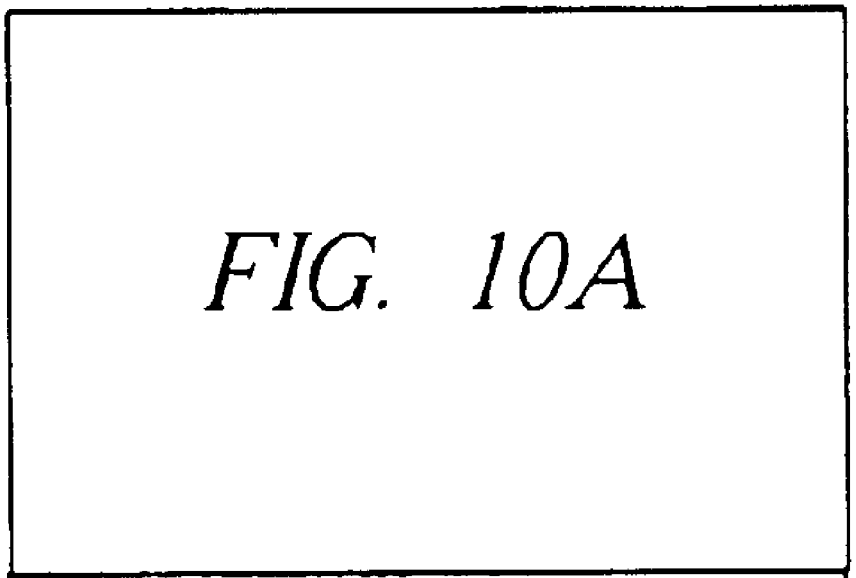
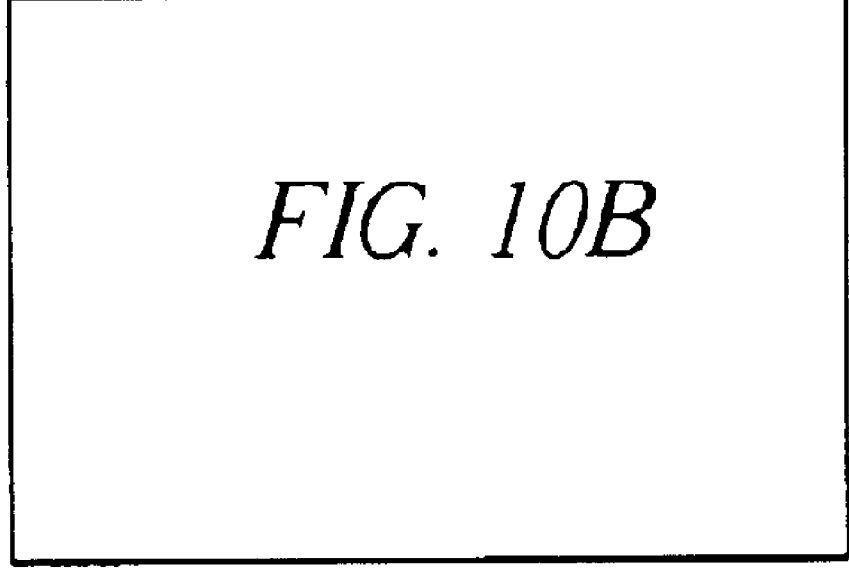
FIG. 10

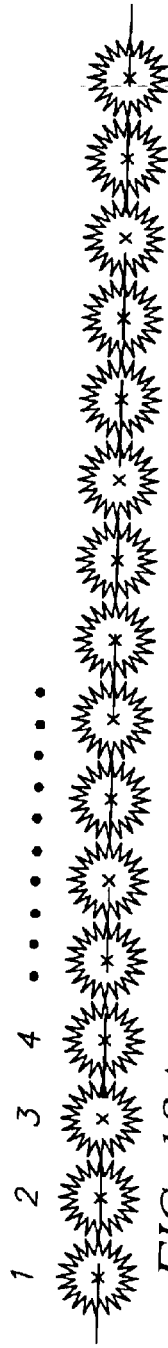
FIG. 13A — ODD AND EVEN SHIFTED SAME
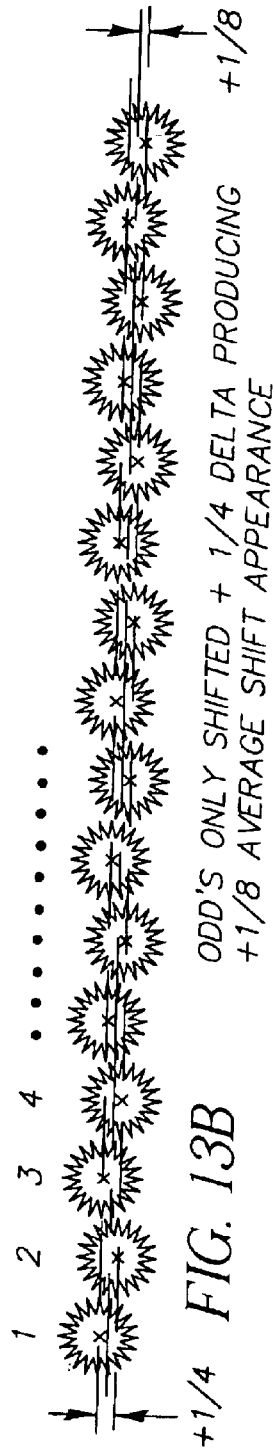
FIG. 13B — ODD'S ONLY SHIFTED +1/4 DELTA PRODUCING +1/8 AVERAGE SHIFT APPEARANCE
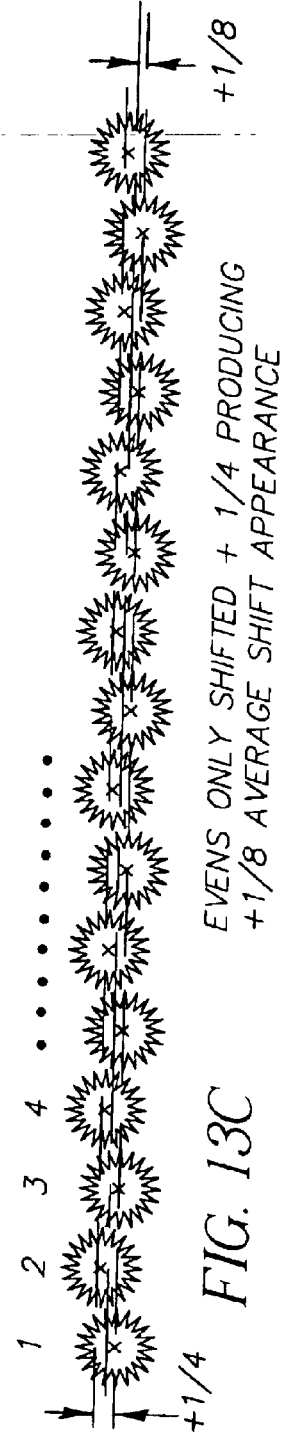
FIG. 13C — EVENS ONLY SHIFTED +1/4 PRODUCING +1/8 AVERAGE SHIFT APPEARANCE

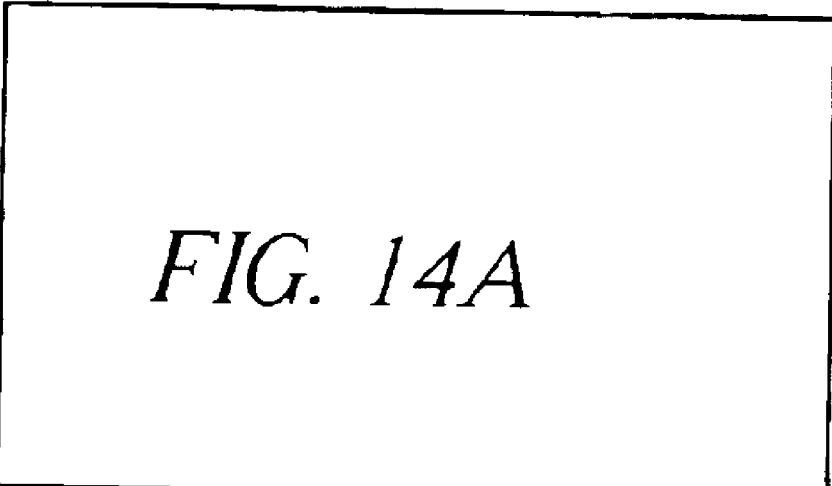
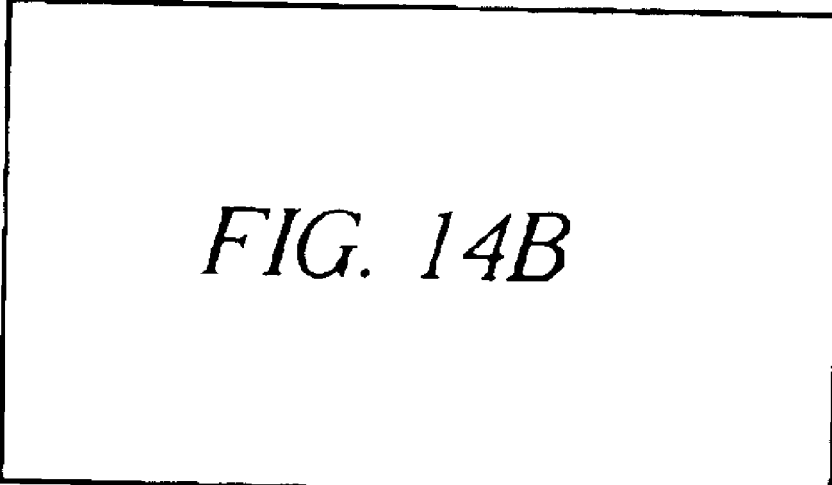
FIG. 14

COARSE AND FINE ELECTRONIC BOW CORRECTION FOR A WRITER

BACKGROUND OF THE INVENTION

1. Field of the Invention

The present invention pertains to bow correction techniques within elements in linear arrays and, more particularly, to more efficient designs that provide increased bow correction while requiring less circuit interconnects than previous designs.

2. Description Relative to the Prior Art

The use of mechanical placement devices to arrange elements in linear arrays results in inherent deviations from true linear placement. The types of elements that are typically placed into linear arrangements can be those that receive data, as well as those that transmit data. Among these are full width scanner, full width ink jet printers, as well as electrostatic printers. Ink jet and electrostatic printers need to place LEDs and their associated drivers in linear arrays. Full width scanners need to place sensors into linear arrays. In each of the aforementioned cases, there are prior art references detailing methods and apparatuses for increasing the linearity of elements used within these devices. The description that follows deals specifically with electrophotographic arts. However, it should be understood that similar or identical issues are relevant to the additional types of receiving and transmitting elements requiring linear placement.

In electrophotographic arts, there is inherent process variability in printhead manufacturing and lens assembly, resulting in individual LED exposure paths that are not directly in line with each other in what is commonly termed the in-track direction (IT). Several causes are: variability of LED placement on the chip; skewed LED chip placement on the substrate; non-linearity of lenses; variability of lenses; inherent bow in lenses; mechanical mounting processes, as well as other causes. The term "bow," as used within this document, references a curved line of LEDs. Ideally, of course, it is desired to have no "bow" effect on an LED exposure plane, as shown below in FIG. 2a; that is the exposure plane is perfectly straight. This is particularly crucial for a multi-station printing device, or multiple color tandem machine, since printheads with similar direction and magnitude "bow" need to be used within the same machine in order to provide acceptable color-to-color registration.

After the electrophotographic writers have been assembled with the optics, the pixel deviation of the writer (from a straight line) can be measured on the image plane. In many cases, the pixel position deviation from the in-track direction (bow) can be more than the pitch of the pixel (for example for a 600 dpi system, the bow can be larger than 1/600 inch). Prior art teachings have shown that this type of pixel position deviation can be corrected electronically using digital circuitry on the printhead writer. One such disclosure is U.S. Pat. No. 5,585,836, issued to Pham et al. The teachings of U.S. Pat. No. 5,585,836 are useful in reducing color-to-color misregistration that occurs within a tandem printing machine and also to correct misalignment in printhead systems having a pixel deviation within elements of the printhead writer. This prior art document illustrates an electronic adjustment to rearrange the electronic printing data that is misaligned into the proper pixel line. However, the circuit provided to correct the misalignment of pixels results in numerous circuit interconnects which must be carried through the printhead board to the LED drivers. Also, the disclosure of U.S. Pat. No. 5,585,836 provides for a pixel alignment correction circuit design that employs numerous semiconductor devices that, in total, use a large amount of space.

FIG. 2b is an example of LED misalignment in a printhead due to positional variations across the length of the printhead. The circles represent the ends of the LED chip arrays. Note that this particular printhead contains two separate bow effect areas. There is a negative bow curve in the first half (left side of graph) of the writer LED placement measurements, then the center comes back close to desired, then another negative bow curve is measured in the second half of the writer. This is just one writer example—any shape and combination of shapes is possible from one device to the next. Current alignment methods specify very tight tolerances on LED locations by: measuring incoming LED placement locations, sorting the printheads in accordance with the resulting bow, and then selecting printheads having similar bow characteristic to be used in the same machine. Referring, again, to FIG. 2b, which shows a rather unique dual bow shape, the possibilities of matching unique characteristic shapes with multiple other printheads becomes increasingly difficult. The cost of sorting printheads for manufacturing, inventory and service is extremely high and the logistics are very difficult. There remains, therefore, a need that will correct mechanical placement errors that are within a single pixel pitch. There further remains a need for a circuit that can provide electronic delay circuitry that can provide pixel pitch correction within a single pixel pitch, or sub-pixel pitch, that employs fewer circuitry elements.

SUMMARY OF THE INVENTION

The present invention addresses the aforementioned problems within the prior art by increasing the linearity at which the LED elements to a printhead expose a receiver. Assembled writers have pixel alignment that deviates from a straight line that can be measured on an image plane. In many cases, the pixel position deviation in the in-track direction (bow) can be more than the pitch of the pixel. The present invention addresses this type of pixel position deviation electronically to reduce color-to-color misregistration in tandem printing machines. The present invention applies a coarse electronic adjustment to rearrange the electronic printing of data into the proper pixel line and then a fine electronic adjustment is made to pixels to get the bow error to further reduce to a fraction of a pixel line. Delays of exposure control signals are used by the fine electronic adjustment to correct linearity by a fraction of a pixel line. The delays can be repeated to multiply the number of delays available and increase the linearity resolution. The delays can also be averaged between odd and even rows of elements to increase apparent resolution. The first embodiment employs digital circuitry to provide the fine adjustment of pixel data that is partially located on the interface board and partially located on the printhead substrate. This reduces the amount of circuitry placed within the ASICs on the printhead substrate. The fine adjustment circuitry of first embodiment provides multiple signals on a single circuit trace between the interface board and the printhead substrate, where each of the multiple signals are active at different times. The second embodiment places all the fine electronic adjustment onto the ASICs within the printhead substrate, resulting in fewer interconnects between the interface board and the printhead substrate than the first embodiment.

The first embodiment of the present invention employs digital circuitry to provide the fine adjustment of pixel data that is partially located on the interface board and partially located on the printhead substrate. This reduces the amount of circuitry placed within the ASICs on the printhead substrate. In the art of electrophotographic printing, a printhead can have thousands of LEDs mounted in a small space. These LEDs are connected to driver circuitry, which is, in turn, connected to additional electronics. The connections on the printhead writer are made through numerous wires that are finer than a human hair. The complexity of a modern printhead dictates a large number of connections. These signals must then be carried throughout the printhead itself, resulting in additional signal traces and associated interconnects. The first embodiment of the present invention alleviates this problem by providing a printhead apparatus that creates the necessary signals on the interface board and within ASICs on the LED substrate.

The second embodiment of the present invention uses fewer interconnects between the interface board and the printhead substrate than the first embodiment. This result of fewer interconnects comes at the expense of an increase in the amount of circuitry placed within the ASICs on the printhead substrate. This results in fewer signals that must then be carried throughout the printhead itself. However, the result is that additional circuitry must be placed in the ASICs on the printhead substrate itself. The second embodiment of the present invention provides a printhead apparatus that creates the necessary signals on the printhead substrate within ASICs that provide the LED drivers themselves, thereby eliminating the need to import these signals from the electronic circuit board that interfaces with the printhead.

These and other objects are provided by the present invention by a bow correction circuit for the linear arrangement of elements comprising: a substrate assembly having a plurality of elements, each having associated driver subassemblies, each of the elements representing a pixel within a line; an interface board coupled to the substrate assembly, the interface board having circuitry that processes image data for the elements; a course bow correction circuit on the interface board that electronically arranges the pixels to improve linearity by integral numbers of pixel pitch; and a fine bow correction circuit located at least partially on the substrate, the fine bow correction circuit providing a first circuit common to a plurality of the elements and a second circuit dedicated to a specific element, the second circuit selecting one of a set of delays that improves linearity of the pixels within the line by a fraction of a pixel pitch.

BRIEF DESCRIPTION OF THE DRAWINGS

The invention and its objects and advantages will become apparent upon reading the following detailed description and upon reference to the drawings, in which:

FIG. 8D is a timing diagram for the diagrams of FIGS. 8A and 8B;

FIG. 9B is a diagram of the delay block shown in FIG. 9A illustrating circuits that are reproduced once per driver on the substrate within the second preferred embodiment of the present invention.

FIG. 13A is a diagram illustrating the odd and even pixel shifted the same;

FIG. 13B is a diagram illustrating the odd pixels only being shifted by ¼ of a line and even pixels not shifted;

FIG. 13C is a diagram illustrating the even pixels only being shifted by ¼ of a line and odd pixels not shifted.

DETAILED DESCRIPTION OF THE PREFERRED EMBODIMENTS

Figure 1:
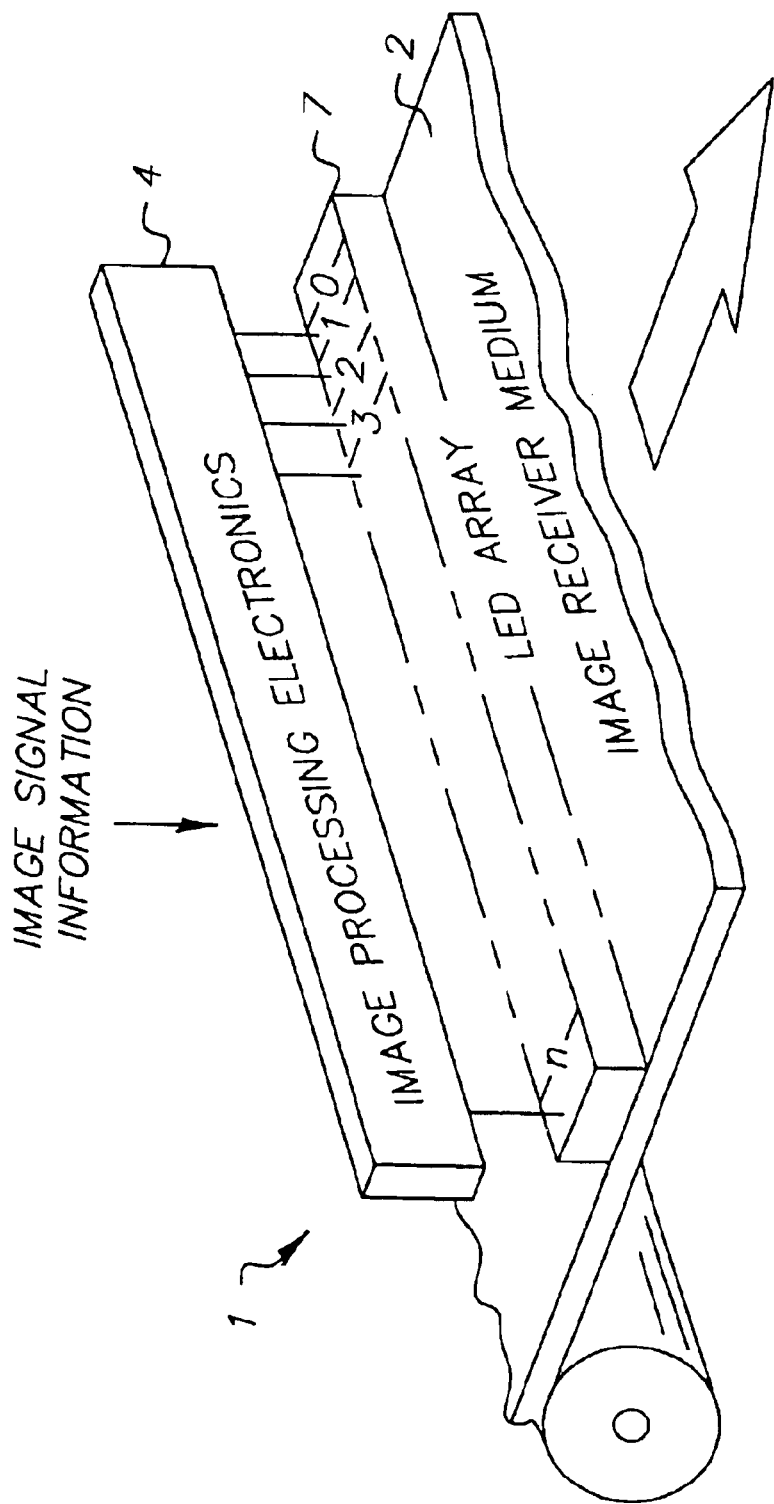
FIG. 1 is an assembly drawing illustrating a writer having a substrate assembly with electronics for an LED array and image processing electronics on an interface board of the prior art.

FIG. 1 is an assembly drawing illustrating an electrophotographic writer, generally referred to as 1, having a substrate assembly 7 containing an LED array with associated electronics and image processing electronics contained on an interface board 4. The writer 1, as shown in FIG. 1, is known within the prior art. The present invention pertains to improved electronics within the interface board 4 and the substrate 7 to provide increased electronic correction for mechanical misalignment of the LED array on the substrate 7.

Figure 2A:
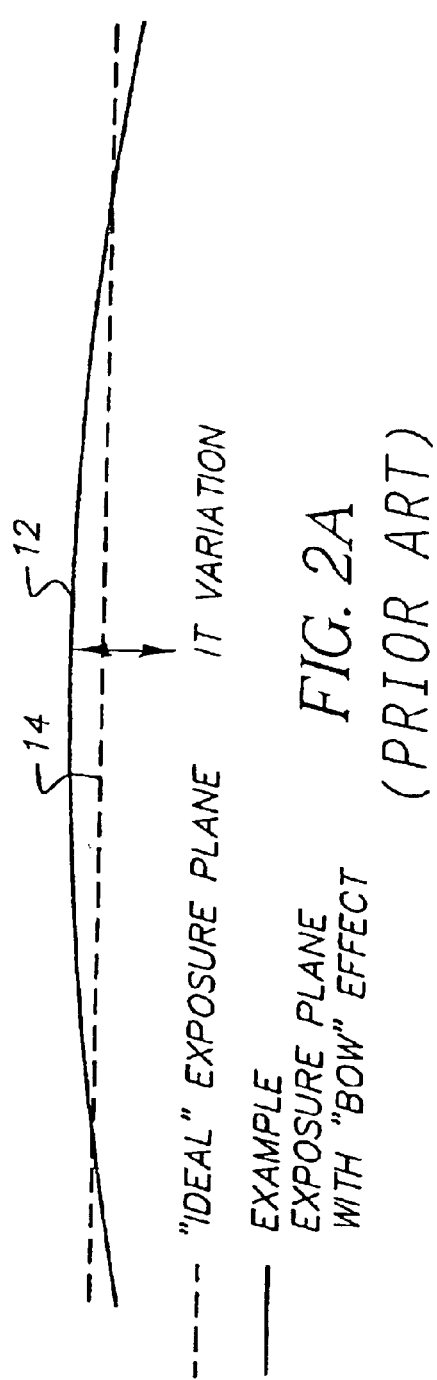
FIG. 2A is a diagram illustrating the bow effect of the prior art compared to the ideal exposure plane.
Figure 2B:
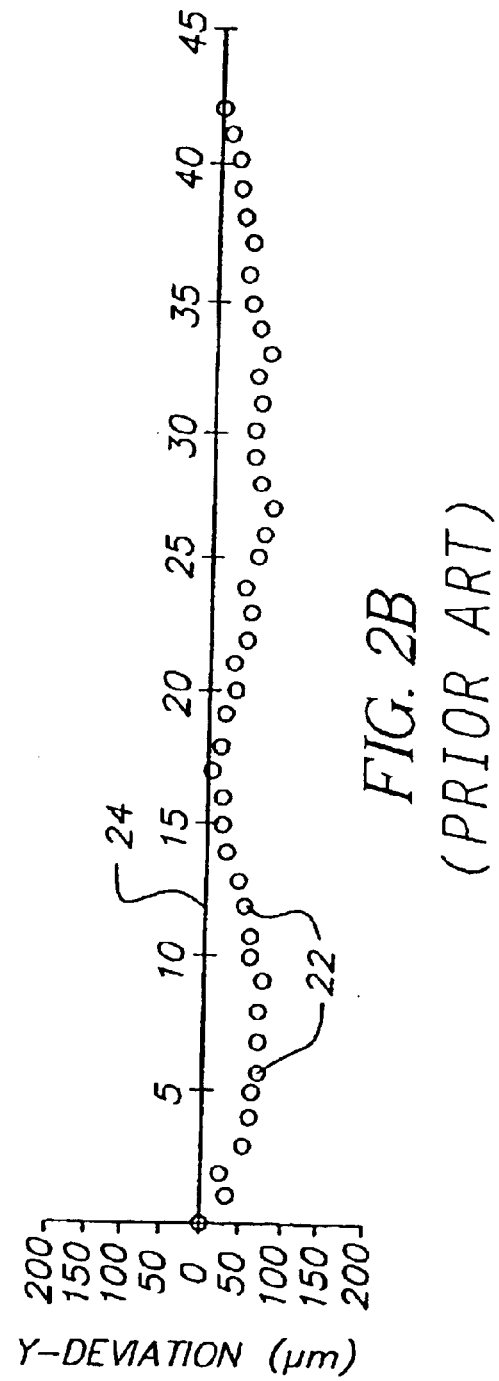
FIG. 2B is an example of various bow effects of the prior art resulting from nonaligned LED elements.

FIG. 2a is an illustration of the previously discussed bow effect 12 compared to the ideal exposure plane 14, while FIG. 2b is an example of cumulative bow effects 22 that result from misalignment of LED elements within the LED array compared to the ideal exposure plane 24. It is evident by looking at FIG. 2b that the pixel alignment error in the in-track direction (bow) can exceed the amount of a pixel pitch within the line. Accordingly, there is a need to perform an alignment of the LED array such that the resulting pixels are more in line with the ideal exposure plane to obtain greater linearity. As previously discussed, prior art teachings have been helpful in providing correction to the amount of a single pixel pitch. However, these prior art teachings have not provided any insight into correcting the linearity of the LED array to less than a single pixel pitch. The present invention provides for a coarse adjustment that will bring pixel alignment within approximately one pixel of the ideal exposure plane. Additionally, the present invention provides a fine adjustment that will align the pixels within a fraction of a single pixel pitch tolerance with respect to the ideal exposure plane, resulting in substantially greater linearity. These correction techniques are performed employing electronic correction for both the coarse and the fine correction within the preferred embodiment to insure that the printing of data from the LED be accurate to a fraction of a pixel pitch. Coarse adjustment will have different printing lines rearranged electronically based on the measured pixel position error from a theoretical straight line. Additionally, fine adjustment is electronically performed to arrange pixels to a fraction of a pixel pitch.

Figure 3:
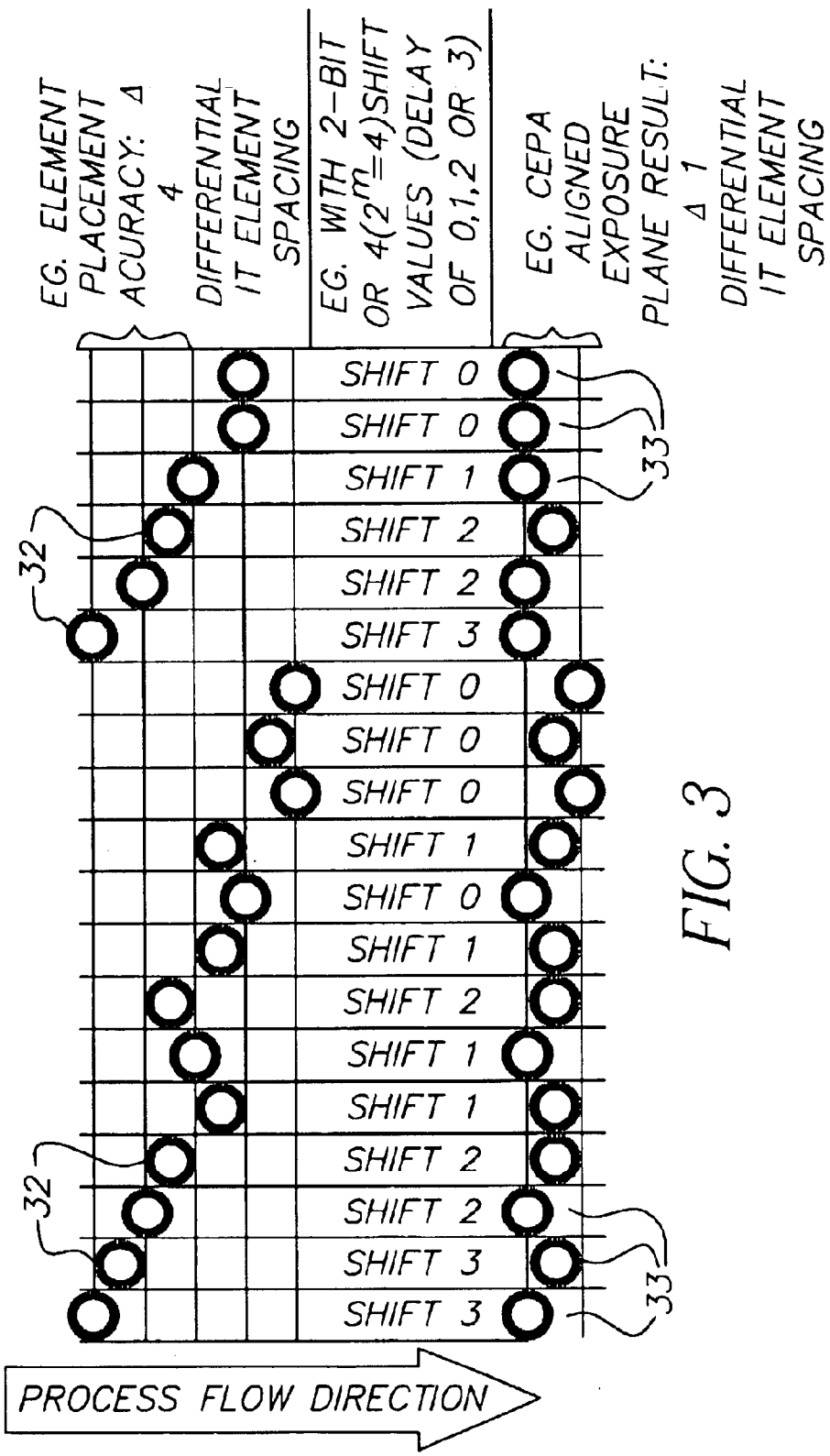
FIG. 3 is an illustration of the type of coarse electronic alignment performed to correct for nonaligned elements.

FIG. 3 is an illustration of a coarse electronic printhead alignment (CEPA) that is performed by the preferred embodiment of the present invention to correct for mechanical misalignment of LED elements 32 that is inherent with the manufacturing process. The CEPA adjustment function will electronically incorporate the following to create the corrected pixels 33. A determination is made of a number s that is used to represent the number of shift values of unique selectable line delay increments that will be employed for each of the LED elements within the exposure device. The number s can be made applicable to virtually any size by changing the number of bits used to represent the number s; let m represent the bit depth, then the number can be represented as $s=2^m$. The CEPA function is to correct coarse element exposure data by delaying whole line increments. FIG. 3 is a view of the coarse correction operation illustrating four unique in track (IT) line shift values that are possible (0, 1, 2 or 3) for electronic shifting of data. It will be understood by those skilled in the art that more than four unique IT values are possible depending on the specific arrangement. FIG. 3 illustrates the implementation of the preferred embodiment of coarse adjustment used to correct mechanically non-aligned elements and produce an electronically coarse aligned in-track (IT) exposure plane.

Figure 4B:
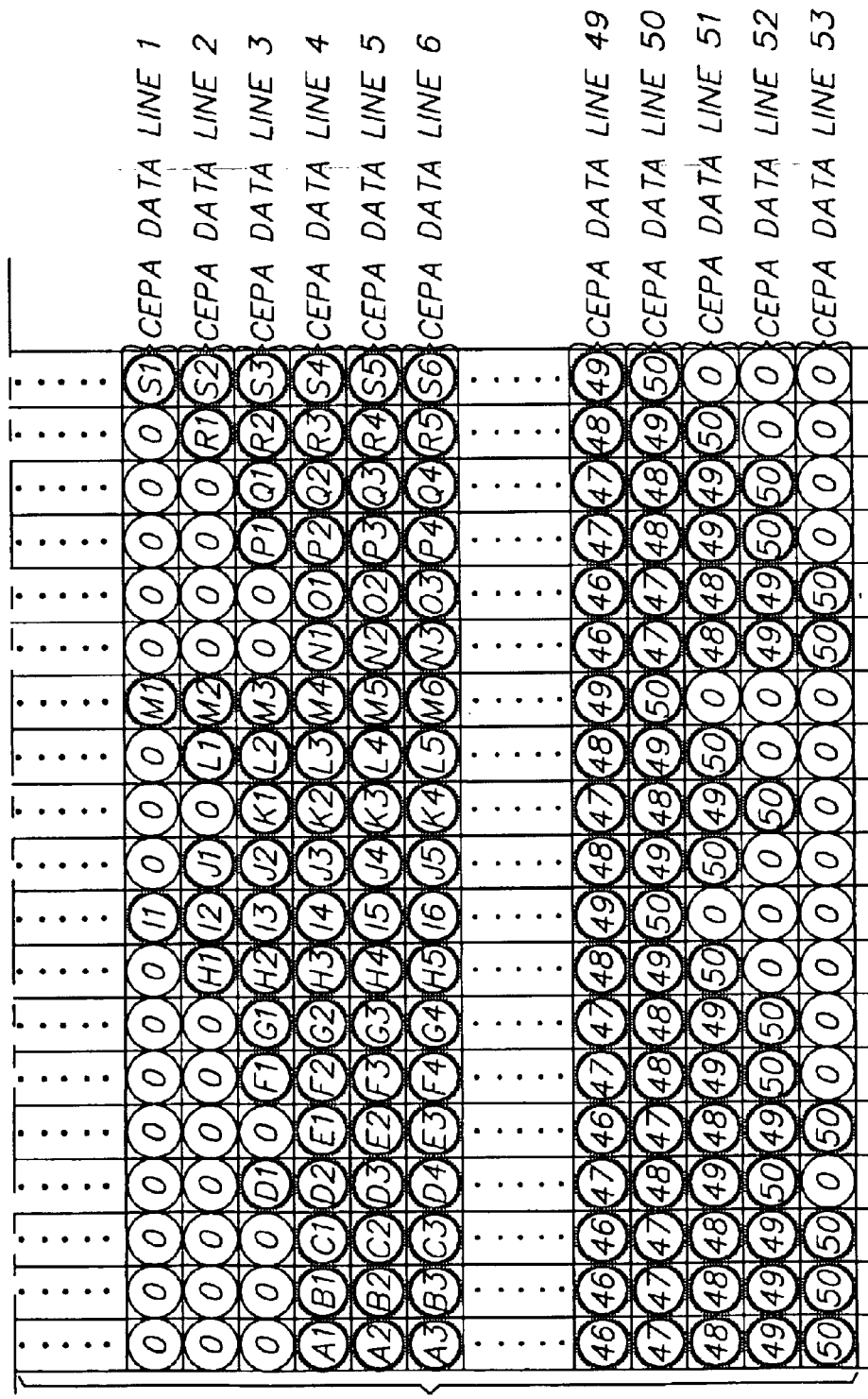
FIG. 4 illustrates data flow to make the correction of the type shown in FIG. 3.

FIG. 4 illustrates the basic data flow to make the coarse correction of the type shown in FIG. 3. The coarse correction data flow as shown in FIG. 4 is only for a 19-element wide section area. This 19-element wide section is for the purposes of illustration. The preferred embodiment will have thousands of elements. However, the data flow for the entire printhead would be far too large to reproduce herein. The coarse measurement data is obtained from an in-track (IT) scanning position measurement procedure that is used to determine the coarse shift amounts for the individual elements. This information is stored in the CEPA m-bit register where is can be read to implement the individual element coarse shift amounts. This example shows m being 2 resulting in 4 ($_2{}^m=4$) possible line shift increments (0, 1, 2 or 3). The image length=50 illustrated over the 19-element wide section is 50 lines.

Figure 5:
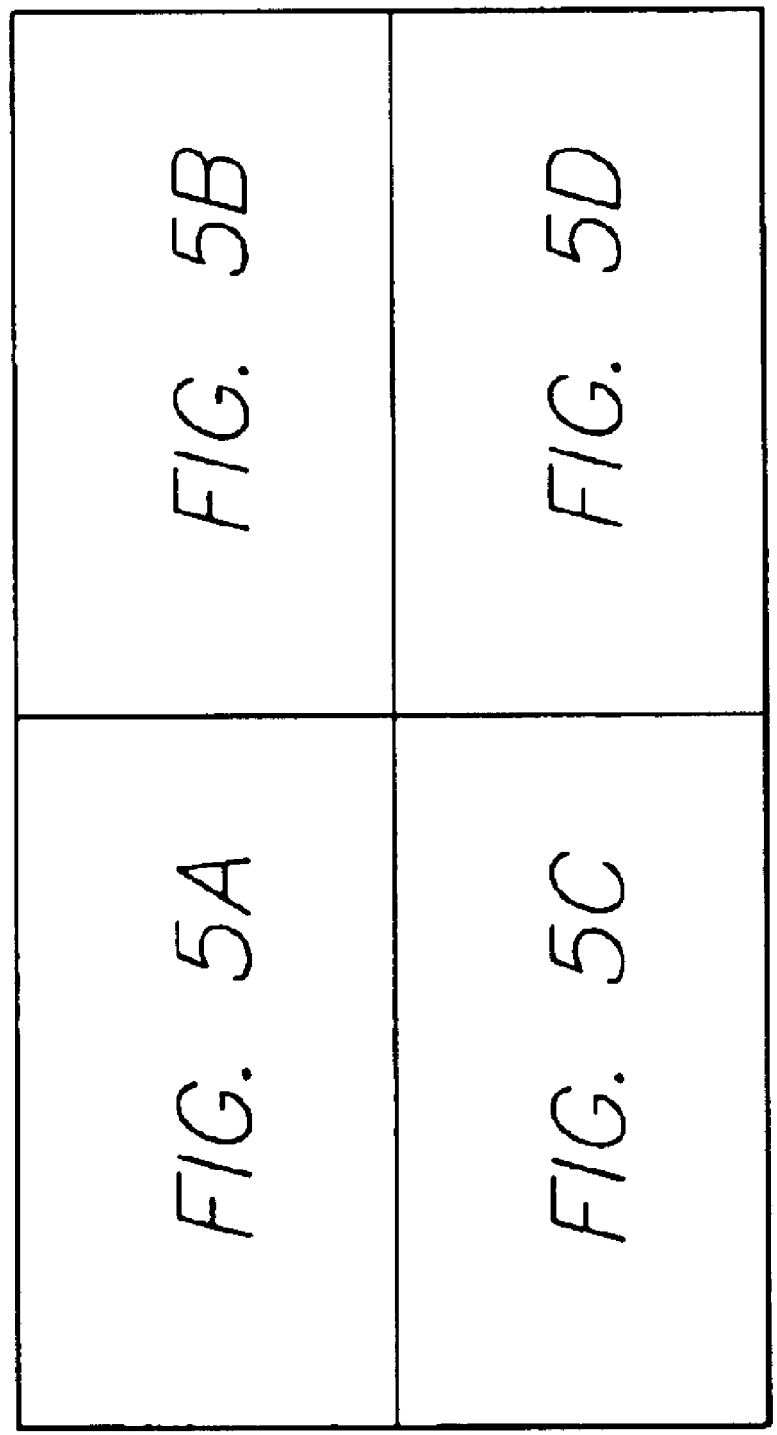
FIG. 5 is a timing diagram for the coarse correction shown in FIG. 4.
Figure 5A:
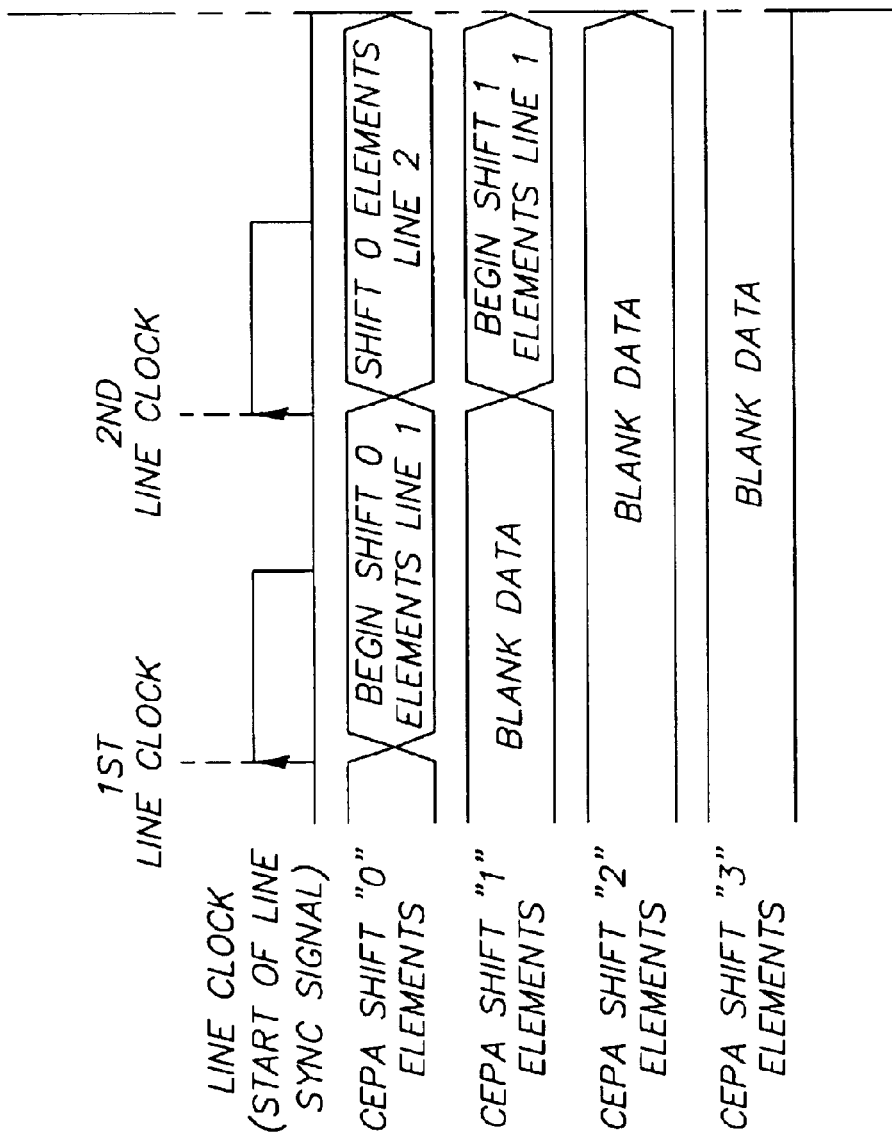
Figure 5C:
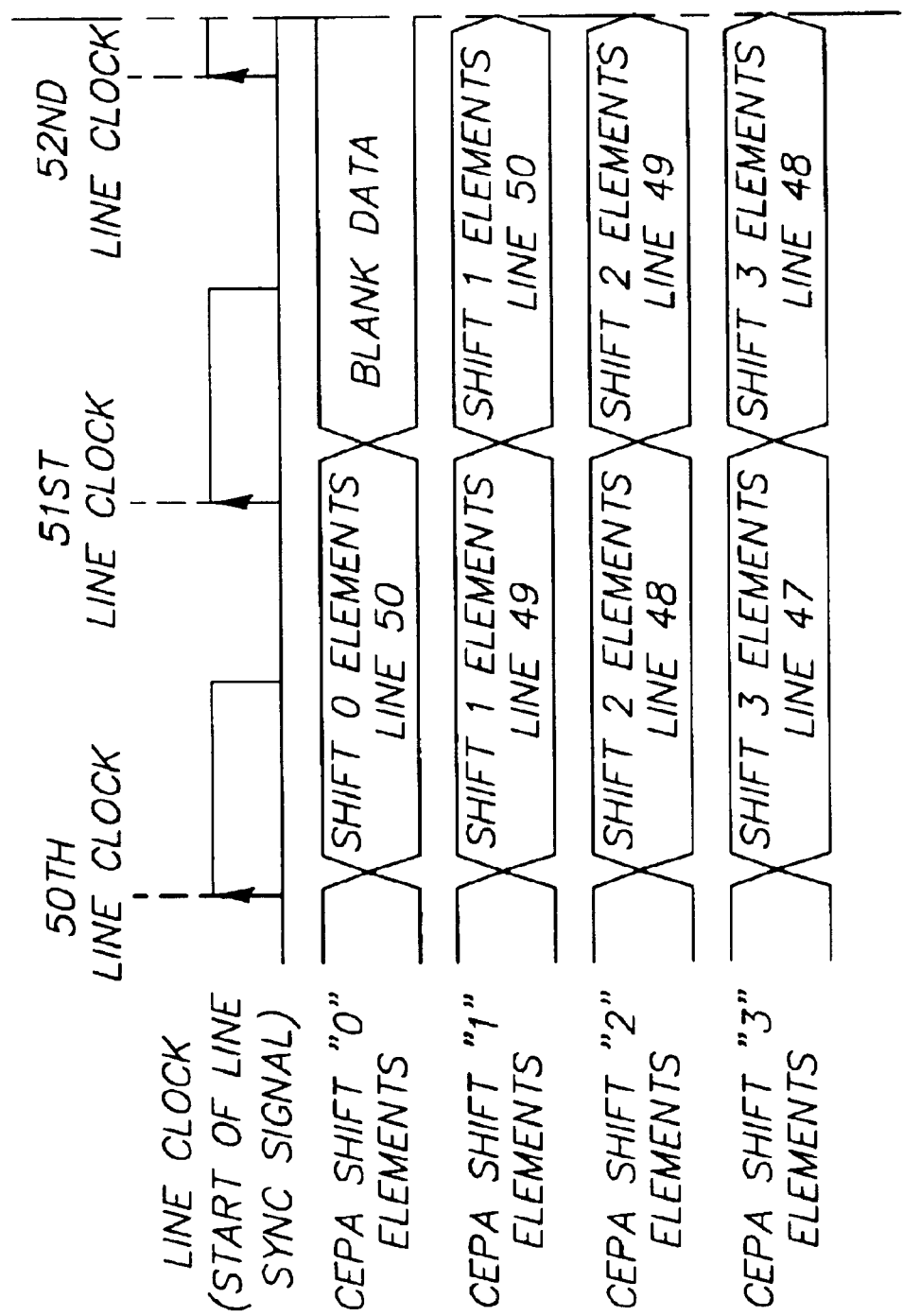
Figure 5D:
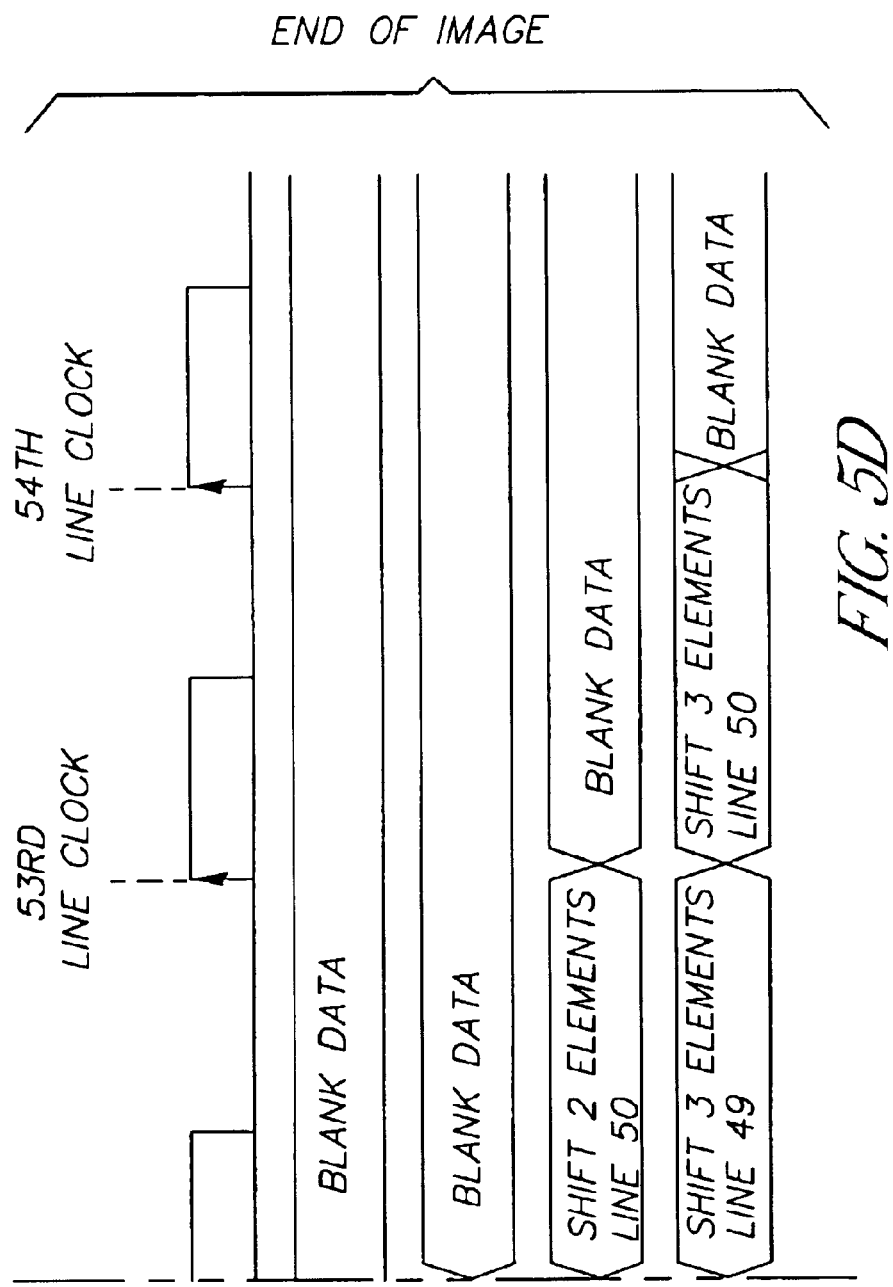

FIG. 5 is a timing diagram for the coarse correction data flow shown in FIG. 4. The top of FIG. 5 illustrates the timing at the start of an image while the bottom of FIG. 5 illustrates the timing at the end of an image. The following discussion of the timing diagram shown in FIG. 5 should be viewed in conjunction with the CEPA data flow diagram shown in FIG. 4. At the occurrence of 1st line clock, data that has not been shifted at all within the CEPA data line 1, shift 0 data, begins processing, all higher shift values that represent data that needs to be shifted get blank data. At the occurrence of the 2nd line clock, data that is to be shifted by one line within the CEPA data line 1, the shift 1 data, as well as the shift 0 data within CEPA data line 2 is processed with all higher shift values getting blank data. At the occurrence of the 3rd line clock, data that has not been shifted at all within the CEPA data line 3, as well as shift 1 data within the CEPA data line 2 and shift 2 data within the CEPA data line 1, begins flowing, and all higher shift values pause and get blank data. At the 4th line clock the shift 3 data for CEPA data line 1, as well as the shift 2 data for CEPA data line 2, the shift 1 data for CEPA data line 3 and the shift 0 data for CEPA data line 4, begins flowing. This process continues through all of the lines as shown at the bottom of FIG. 5. Note: ($2^m-1$) extra line clocks are needed for complete image processing.

Figure 6:
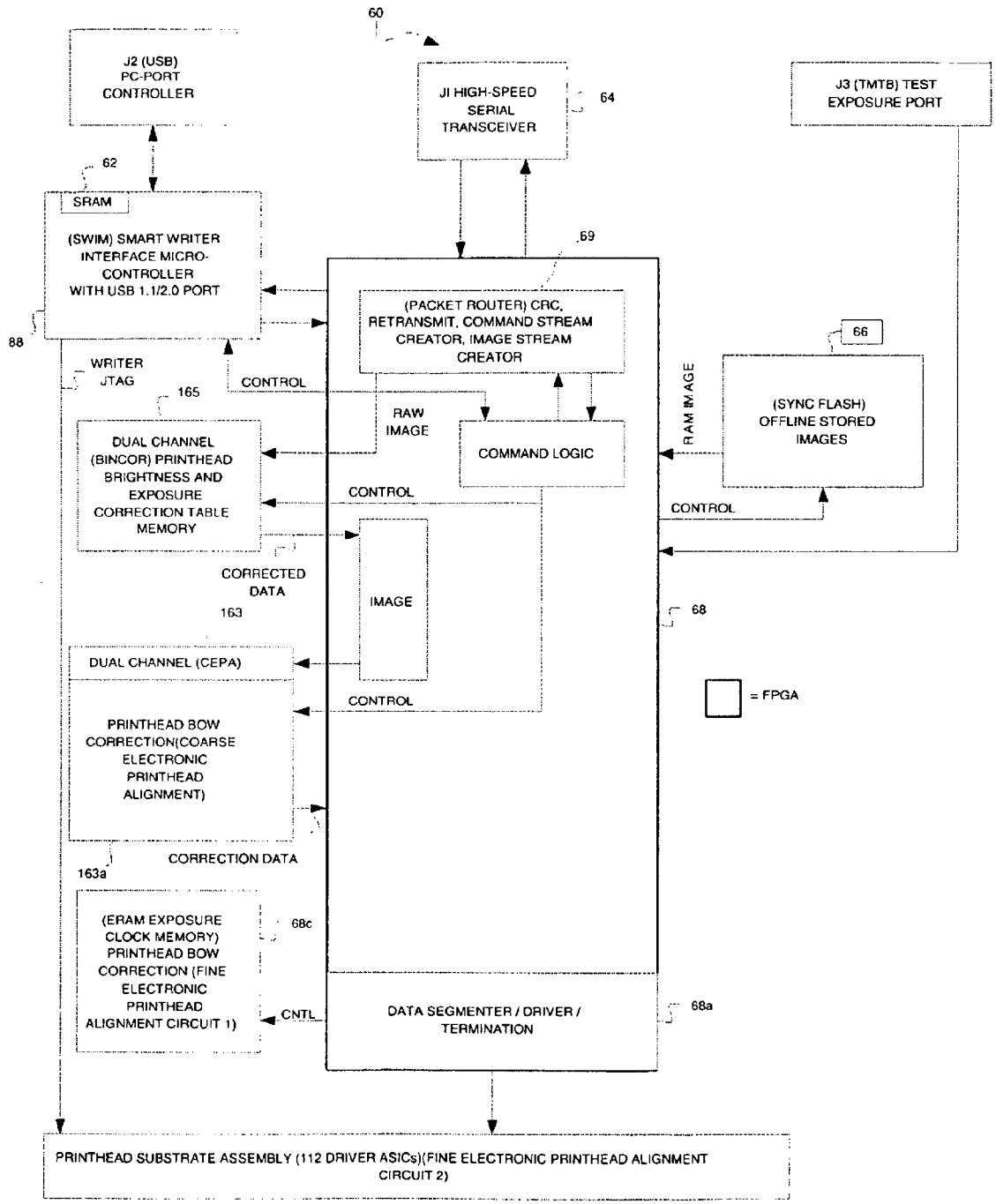
FIG. 6 is a block diagram for an interface board containing the coarse correction described in FIGS. 3, 4 and 5.

FIG. 6 is a block diagram illustrating the functions performed by the interface board 60, including the CEPA function of the first preferred embodiment of the present invention. The CEPA function shown in FIG. 6 is performed using values that are stored for each of the LED elements. This approach allows the CEPA function to be adaptable to virtually any width of exposure device and any element exposure device format, e.g. binary (on-off) or gray level (any bit size). Also, the CEPA function is applicable for any element spacing (e.g., 300 dpi, 400 dpi, 600 dpi, 1200 dpi, . . . etc.). The hardware that is used to implement the CEPA function can be directly on the interface-board 60 itself, or somewhere previously in the path of the image processing electronics. The CEPA function can be performed wholly or partially in an ASIC, or a similar technology device. In the first preferred embodiment, an FPGA 68 is employed on the interface board 60 to provide control electronics for the CEPA function. There are numerous discrete memory devices provided within the CEPA function. It will be understood by those skilled in the art that this does not necessarily have to be the case. Currently, FPGA technology has advanced to the extent that these memory devices can, at least partially, be located within the FPGA itself, as will be discussed later in the second preferred embodiment.

The SWIM/USB port 88 contains an 8K internal SRAM 62 that is the working memory for the software to use to perform necessary operations to the interface board 60 devices. The software needs such an area to perform operations to data and arrays of data. This memory is volatile, meaning it will lose its contents when power is removed.

A Re-Transmit Line (RTL) feature is included to improve image quality. RTL is performed with the CEPA block 163 and the FPGA, which work together to perform RTL, the FPGA contains the RTL control logic, the CEPA is the memory that actually stores the line data. In the event of a transmission error in the high-speed serial image data path link, the RTL circuit will detect the error and discard all image line data and replace the discarded data with the previous line of image data. The RTL will, thereby, prevent the corrupt image data from being exposed on the print. Data can occasionally become corrupt due to EMI, or ESD or power line surges type disturbances.

High Speed Serial Transceiver 64 receives the high-speed image data from the output image path board (not shown). The packet router is firmware controller logic (in FPGA) that manages data packet flow to/from the interface board 60. Flash 66 is used to store writer specific data. Flash 66 is a non-volatile (NV) memory within the preferred embodiment in order to hold its contents when power is removed. The information held within Flash 66 is information such as printhead specific LUT (look up table) data, printhead calibration and scanning data, printhead specific information and other data that is specific for that printhead. This specific data is determined initially and does not need to be determined again. Accordingly, there are substantial advantages to storing this information locally. Local storage removes the need to store printhead specific files in another area, which is traditionally a hard drive in the main machine platform and then download the information to the printhead. Smart Interface Micro Controller/USB port 88 is the brains of the interface board 60 and allows the printhead to perform necessary setup procedures without requiring assistance from other processors or controllers, which would traditionally be placed within the main machine platform. A substantial advantage is achieved over prior art arrangements because all printhead operations are performed within the printhead itself, increasing the data throughput and making the printhead very self-sufficient. The implementation of the Smart Writer Interface Micro Controller/USB port 88 in the first preferred embodiment is a discrete microcontroller on the interface board 60. However, it will be understood that modem FPGA devices would allow the placement of the entire Smart Writer Interface Micro Controller/USB port 88 within a larger FPGA on the interface board 60, which is an arrangement that will be addressed in the second preferred embodiment.

BINCOR 165 includes synchronous flash memory "sync flash", which is a type of non-volatile memory used to provide the correction tables (COR of BINCOR 165) that contain the writer correction features in a manner that is, essentially, consistent with prior art patents. While the correction performed by the COR tables is consistent with conventional techniques, the inclusion of the COR tables on the interface board 60 provides an advantage for the present invention. Typically within the prior art, the COR tables are placed earlier in the image processing path. The printhead brightness tables (BIN of BINCOR 165) contain a writer brightness correction feature in a manner that is known within the prior art and are also found in BINCOR 165. The corrected data exits BINCOR 165 and flows to the image path of FPGA 68. This image path directs data to RTL/CEPA Block 163. All data sequentially flows through both CEPA 163a and RTL 163b. CEPA corrected image data flows to RTL 163b. The CEPA correction address, which is composed of the LED address and the CEPA LUT value, is controlled by the FPGA 68 control logic.

Data flows through the CEPA 163 circuit in a manner similar to FIFO technology on interface board 60. Printhead bow correction 163a is the electronic LED alignment, previously discussed, that is performed within CEPA 163. The CEPA 163 is implemented with a sync flash memory, as described above, and not inside the FPGA 68, due to the memory size requirements of CEPA 163 which are too large to be cost effectively implemented within a FPGA. The CEPA 163 and bow correction 163a is performed after the BINCOR 165 in a serial manner.

The CEPA 163 function shown in the preferred embodiment is controlled from within FPGA 68 such that the performance of the CEPA function is similar to the operation of a FIFO. The FIFO-like operation is provided by virtue of the logical elements available within FPGA 68, as well as RTL/CEPA 163 and the memory resources available from BINCOR 165. It is also provided that an architecture could employ discreet FIFO components, as well as implementing the CEPA 163 in custom VHDL code within FPGA 68. Also CEPA 163 can be implemented using VHDL code within a SRAM memory device. Numerous other configurations will be apparent to those skilled within the art.

Data segmenter/LED driver IC control SEG 68a formats and synchronizes the data appropriately to match the driver IC and bus. SEG 68a is performed within FPGA 68 in the first preferred embodiment.

Still referring to FIG. 6, clock generator 68c is formed within FPGA 68 and contains an exposure clock memory as well as delay circuitry that is used by the fine electronic printhead alignment (FEPA) to create a series delayed version of latching and clocking signals. The first embodiment of the present invention, employs an arrangement wherein these delayed signals are created on the interface board in order to alleviate the ASICs on the printhead substrate from having to provide the circuitry necessary to perform these functions. The delay circuitry of the FEPA function will make available several versions of latching and clocking signals that allow the electronic fine-tuning of exposure data to within a fraction of a pixel pitch.

Figure 7:
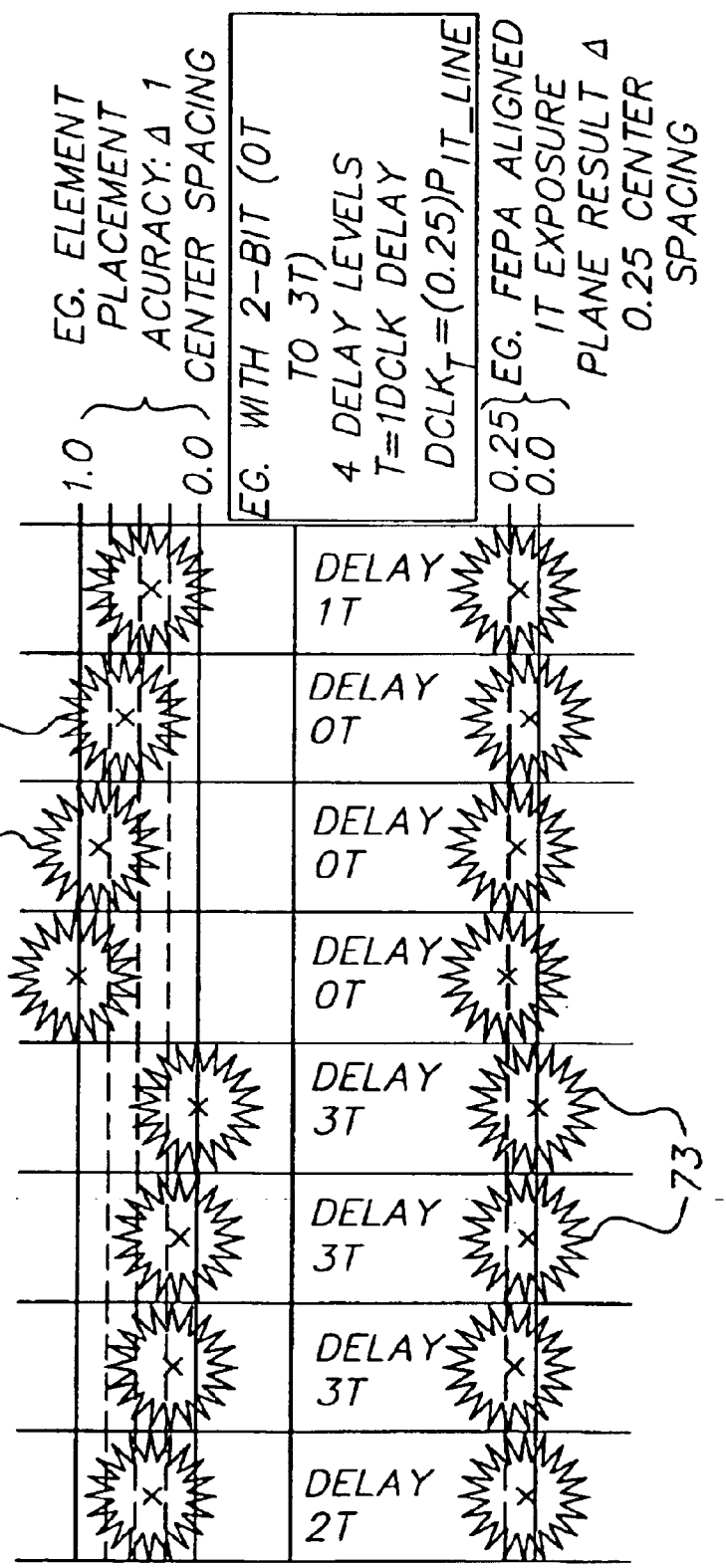
FIG. 7 is an illustration of the type of fine adjustment used to correct for LED elements nonaligned by only a single pixel pitch.

FIG. 7 is an illustration of the Fine Electronic Printhead Alignment (FEPA) function that provides the precise adjustment needed to correct LED element misalignment that still remains after the course correction performed by the CEPA. After application of the CEPA function, the LED element misalignment results in the CEPA aligned pixels 72 that are misplaced by as much as a pixel pitch (in the case of the preferred embodiment this pixel pitch is $\frac{1}{600}$"). Therefore, the present invention provides a FEPA function to bring the overall alignment of the FEPA corrected pixels 73 closer to the ideal exposure plane. The FEPA function provided by the first preferred embodiment accomplishes the fine tuning of printhead pixel data by dividing the circuitry between the interface board 60 (FIG. 6) and the printhead substrate assembly 7 (of FIG. 1). The interface board 60 contains circuitry that provides storage of offsets for pixel position. Internal FPGA memory will be used to store FEPA pixel offsets. Each pixel offset can individually be assigned one of the selectable offsets. By correctly assigning the appropriate offset, a pixel can be placed to the correct time exposure plane. The FEPA circuitry that is placed on the printhead substrate is placed within integrated circuits that are the drivers for the LED elements. Elements to the FEPA function can be performed on a per driver basis, a per pixel segment basis (such as groups of 2, 4, 8, etc. elements) or a per pixel element basis. FIG. 7 shows a view of the FEPA operation wherein 2-bits (resulting in 2 or 4 unique delay values) are used. The FEPA can correct for mechanically non-aligned elements and produce an electronically aligned in-track (IT) exposure plane.

Figure 8A:
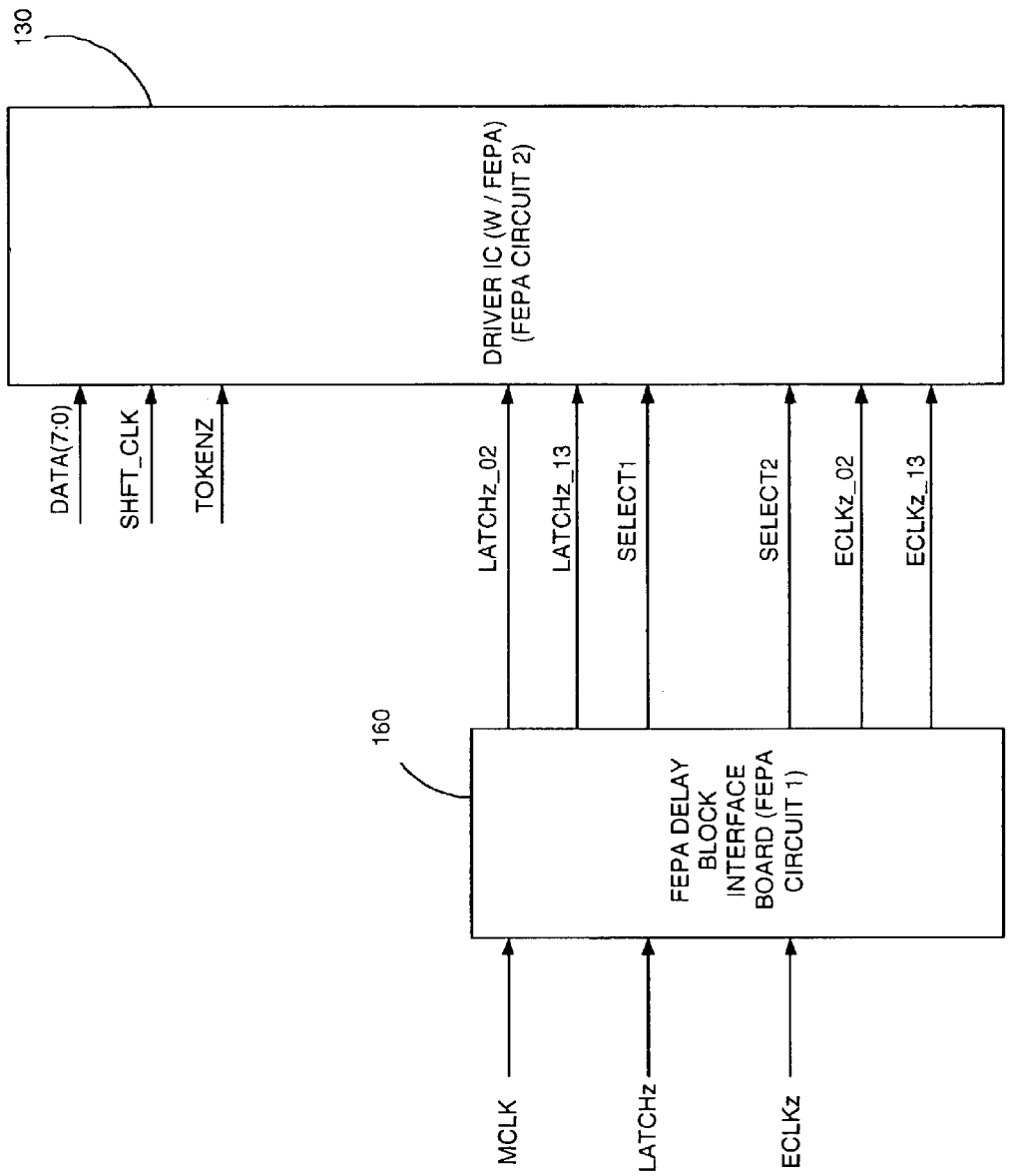
FIG. 8A is a high level block diagram of the fine adjustment function illustrating the relative placement of functions on the interface board and the substrate, as envisioned by the first preferred embodiment of the invention.
Figure 8B:
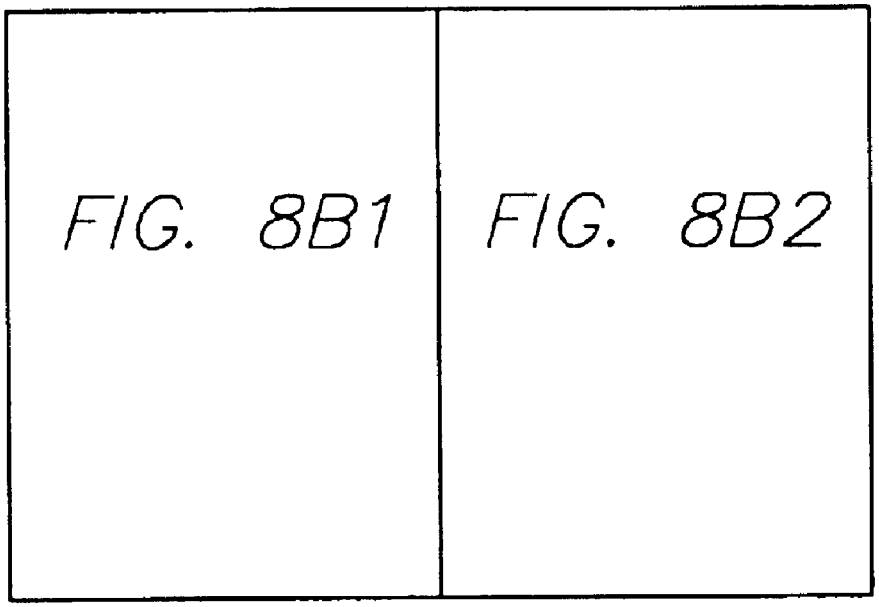
FIG. 8B is a block diagram of the fine adjustment electronics placed on the substrate by the first preferred embodiment of the invention.

Referring to FIG. 8A, the functional layout of the FEPA function between the interface board 60 and the printhead substrate driver 130 is illustrated as provided by the first preferred embodiment of the invention. As previously discussed, the interface board 60 contains the FEPA Delay Block 160 which is circuitry in the delay circuitry of the clock generator 68C that is used to create various delayed versions for each of the MCLK, LATCHz, and ECLKz inputs by a given amount. The FEPA Delay Block 160 will output several FEPA signals to the printhead substrate driver 130, which contains the remaining portion of the FEPA function. As illustrated in FIG. 8B1, the combining of FEPA signals on a single circuit path is used to reduce the number of signal paths between the interface board 60 and the printhead substrate driver 130. Signals such as intLatch0z and intLatch2z are active at different times and, accordingly, can use the same circuit trace without conflict. Therefore, they are both placed on the same circuit path, LATCHz_02. In a similar manner, LATCHz_13 combines intLatch1z and intLatch3z, EXPCLKz0_2 combines intEclk0z and intEclk2z, and EXPCLKz1_3 combines intEclk1z and intEclkz3. Select1 and Select2 are provided to allow selection between the combined signals. DATA[(n−1): 0], P-BIT EXPOSURE DATA, SHFT_CLK and TOKENz arrive from other areas of the interface board 60.

Figure 8C:
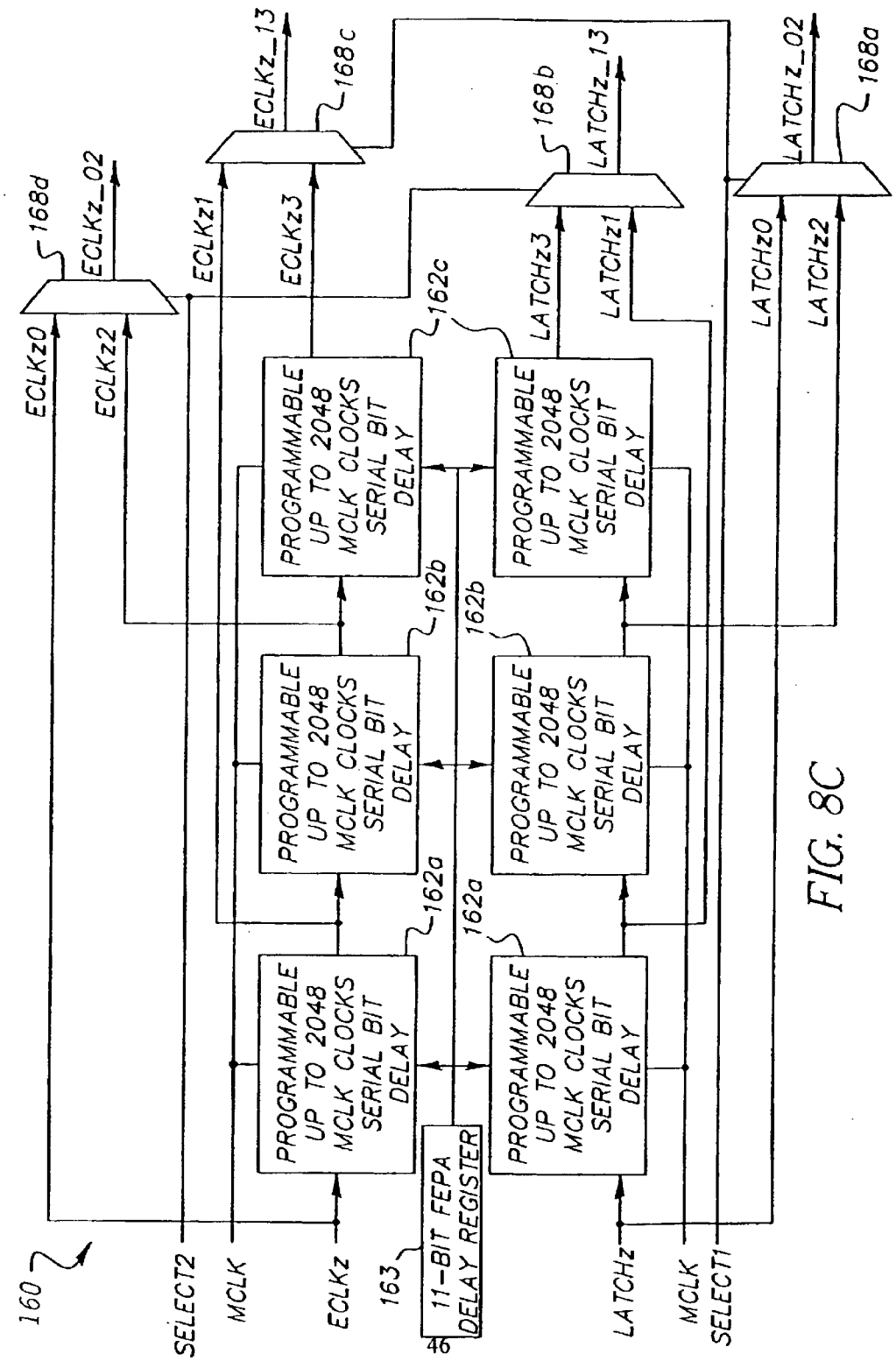
FIG. 8C is a block diagram of the fine adjustment electronics placed on the interface board by the first preferred embodiment of the invention.

FIG. 8C is a more detailed block diagram of the FEPA Delay Block 160 that is placed on the interface board 60. Each of the ECLKz and the LATCHz signals will traverse three delay clock circuits 162a, 162b, and 162c that each comprise up to 1024 flipflop delay. These circuits are programmable, meaning the number of flipflops used within the delays can be altered by the FEPA delay register 163 which, in the preferred embodiment, has 11 bits. This circuitry shown in FIG. 8C produces three more time delayed versions of the ECLKz and LATCHz signals, yielding a total of four possible choices of each: 1) no delay; 2) 25% line delay; 3) 50% line delay; or 4) 75% line delay. The 11-bit FEPA delay register 163 is used to control each delay block to be approximately 25% of the process line time. By making this register a JTAG accessible register, the delay times can be adjusted to match any process print speed. In the first preferred embodiment, the ECLKz and LATCHz signals are each provided with three delay circuits 162a, 162b, and 162c, yielding four versions of each signal that are time offset by 25% of line delay). However, by increasing the clocking frequency for the flip-flops used in delay circuits 162a, 162b, and 162c, the delay circuits could be reused such that the first delay circuit 162a would also serve as the fourth delay circuit 162a, the seventh delay circuit 162a and so on. The second delay circuit 162b would also serve as the fifth delay circuit 162b, the eighth delay circuit 162b and the third delay circuit 162c could be used as the sixth delay circuit 162c and the ninth delay circuit 162c. Here, SELECT1 and SELECT2 signals would control which delay signal is used. The 11-bit FEPA delay register could control the number of clocks in each of the delay circuits 162a, 162b, and 162c. The amount of resolution could be increased from 25% (¼) of a line to 17.5% (⅐) of a line and even further to 10% (⅒) of a line. Additionally, instead of employing three delay circuits 162a, 162b, and 162c for each of the ECLKz and LATCHz signals, only two be employed and reused as discussed above. Such arrangement would yield a FEPA resolution of 20% (⅕) of a line requiring less circuitry and that also could provide delays that can be reused to provide additional delays.

Still referring to FIG. 8C, Multiplexer 168a, combines LATCHz0 and LATCHz2 into the LATCHz_02. In a similar manner, Multiplexer 168b, combines LATCHz1 and LATCHz3 into LATCHz_13, Multiplexer 168c combines ECLKz1 and ECLKz3 into ECLKz_13 and multiplexer 168d combines ECLKz0 and ECLKz2 into ECLKz_02. SELECT1 and SELECT2 are used to select between the combined signals, as shown.

FIG. 8B is an illustration of the FEPA function of the first preferred embodiment that is provided on the printhead substrate 130 and incorporates numerous features that those skilled in the relevant art will understand can be applied individually or in combination. The FEPA circuitry is provided on a per LED basis, on a per segment basis (per 16 LED in FIG. 8B1) and on a per ASIC basis. These three distinct sections to the FEPA function are illustrated in FIG. 8B. The circuits are provided on a per ASIC basis which are the switch circuit 70. The switch circuit 70 includes switch blocks 77a, 77b, 77c, and 77d that are provided on the printhead substrate for each ASIC. Four exposure clocks and four exposure latch signals arrive in pairs, combined on four signal lines such that two different delay versions of each signal are contained on each line. Therefore, the EXPCLKz0_2 signal line will carry both the intEclk signal that has a zero delay as well as the inteclk signal that has been twice delayed as a single input to switch block 77c. In a similar manner the EXPCLKz1_3 signal line will carry both the inteclk signal that has been once delayed as well as the inteclk signal that has been three times delayed as a single input to switch block 77d. The LATCHz0_02 signal line will carry both the intLatch signal that has a zero delay as well as the intLatch signal that has been twice delayed as a single input to switch block 77a. In a similar fashion the LATCHz_13 signal line will carry both the intLatch signal that has a zero delay as well as the intLatch signal that has been twice delayed as a single input to switch block 77b. These combined signal lines are possible because the signals they carry are never active at the same time. Additionally, the switch blocks in the preferred embodiment are double pole/double throw switches that provide two outputs. One of the outputs for switch bocks 77a, 77b, 77c, and 77d will be ground while the other output will be the selected signal. The signal used from each of switch blocks 77a, 77b, 77c, and 77d is determined by select lines SELECT1 and SELECT2, which determine the output of the switch blocks 77a, 77b, 77c, and 77d in accordance with the delay truth table seen in FIG. 8B2.

Each of the select lines SELECT1/SELECT2 control switch blocks 77a, 77b, 77c, and 77d which include the switching circuitry to select one of either the latching or the clocking signals that are then placed on a single signal line. This circuitry allows the delay0/delay2 signals and the delay1/delay3 signals to use the same signal line with only one of the signals active at any given time. This results in fewer lines that need to be routed from the interface board to the substrate containing the ASICs and LEDs. In the preferred embodiment the delays are in increments of 25% of the line time. Therefore, delay0=no delay, delay1=25% line time, delay2=50% line time, delay3=75% line time. It should be noted that, in the preferred embodiment, the Exposure cycle (257 period cycle) is 40% of line time maximum. Guaranteed operation of this particular implementation requires that the 257 period exposure clock cycle (one cycle per line) is less than 25% of line time. In other words, if the process dictates that a line be printed every 100 uSec then the 257 period exposure clock cycle must be 40 uSec or less.

Switch circuit 70 is provided such that there is one per ASIC to produce four unique exposure clock and latch signal pairs illustrated in FIG. 8B1. The delayed intEclk's and the corresponding delayed intLatch signals go to all six MUX/Counter blocks 75. The software accessible 2-bit FEPA register 76 (one for each MUX/Counter block) selects which FEPA delay value (0, 1, 2, or 3) of the incoming delay signals to use. This selected exposure clock and corresponding latch signal gets sent to all LED's in the segment. In this diagram each section contains 16 LED's but can be adapted to be any size including one LED per section for individual element control.

The next area to be discussed in FIG. 8B1 is the segment block 75 which is provided multiple times per ASIC on the printhead substrate. In the first preferred embodiment, there will be six segment blocks 75 provided per ASIC, with each containing multiplexers 78a and 78b, as well as UP/DOWN Counter 79 and 2-bit FEPA Register 76. The segment block 75 divides each of the ASICs (the driver IC) into 6 FEPA sections (with 16 LED elements allocated for each of the segments) but can easily be adapted to any size section per LED, including one per element. The latch signals intLatch0z, intLatch1z, intLatch2z and intLatch3z from switch blocks 77a and 77b are input into four to one multiplexer 78a. The intEclk0z, intEclk1z, intEclk2z and intEclk3z signals from switch blocks 77c and 77d are input into four to one multiplexer 78b. The 2-bit FEPA register 76 in segment block 75 is applied to multiplexers 78a and 78b to allow unique delay selection of latching and clocking signals, either delay0, delay1, delay2, or delay3. The 2-bit FEPA Register 76 provides the selection for multiplexers 78a and 78b. The 2-bit FEPA Register 76 is a 2-bit software accessible register (one per segment) that determines which of n values for the delayed Eclkz/Latchz signals to send to each element within that segments blocks. In the preferred embodiment, previously discussed, the value of n is 2. The software addressability of the 2-bit FEPA Register 76 is provided within the preferred embodiment via JTAG lines. The 2-bit FEPA register is programmed through the JTAG lines. The value that is placed in the 2-bit FEPA register is determined by using production scanning equipment that will measure the Y location of each LED. Software will take this data and produce the required 2-bit numbers needed for each specific printhead. Up/Down counter 79 is an 8-bit counter that controls the Exposure cycle. The DlyLatch signal resets the Up/Down counter, with each falling edge of the DlyEclk signals incrementing/decrementing the counter by one.

The third portion of FIG. 8B2 is the LED block 80 having circuits on the substrate that are provided for each of the LEDs. The circuits and signal paths ending with "_x" indicate circuitry that is repeated for each LED element. Incoming exposure data gets stored in P-BIT LATCH 82 on the edges of ShiftClk. P-BIT LATCH is the only circuit shown within LED Block 80 that is provided for the entire ASIC. Each individual LED element has its exposure data latched into an individual P-BIT MASTER REGISTER_X 83 on the edge of the Token signal during the data loading for each line. This is illustrated in the timing diagram of FIG. 8D1. All of the LED elements have data that is latched into their respective SLAVEA REGISTER_X 84 on the edge of the intLatch0z signal. Data from the SLAVEA REGISTER_X is latched into the SLAVEB REGISTER_X 85 on the edge of the delayed Latch (DlyLatch) signal. The DlyLatch signal and a corresponding delayed Eclk (DlyEclk) signal feed the exposure circuit simultaneously. The falling edge of DlyLatchz (the delayed Latchz signal) transfers the SlaveA data to the SlaveB register and also resets the exposure circuit. NOTE: The first falling edge of the delayed exposure clock train (DlyEclkz) begins the exposure circuit of the element.

The first preferred embodiment of the FEPA function is to reduce the circuitry that is allocated to individual ASICS on the LED substrate. This approach requires additional circuit paths to run throughout the printhead and is the subject of the first preferred embodiment. The first preferred embodiment creates common circuitry on the interface board to reduce the number of circuits that have to be included in ASICs on the printhead board. This is accomplished within the present invention by providing the FEPA function in conjunction with the CEPA function. The FEPA of the first preferred embodiment of the invention, is placed partially on the interface board. Preferably, the part that is partially placed on the interface board is the circuit that creates multiple delays, each of which are intended to provide fine adjustment of a pixel. Accordingly, each of the delays is a fraction of a line period to adjust the pixels by an equivalent fraction of a pixel pitch. The FEPA circuit provides n unique selectable delay clock cycles derived from the incoming exposure clock signal, and provides n unique selectable latch signals from the incoming line latch signal. The present invention specifically provides that the FEPA be adjustable to virtually any resolution simply by changing the bit depth n. Both the ECLK and the MCLK are derived from the same high-frequency clock, and they are synchronized with one another. ECLK and MCLK within the preferred embodiment are based on a 60 MHz clock. MCLK is 60 MHz and ECLK is 30 MHz or less as it changes throughout the exposure cycle within a given line.

Second Preferred Embodiment of the Invention

Figure 14A:
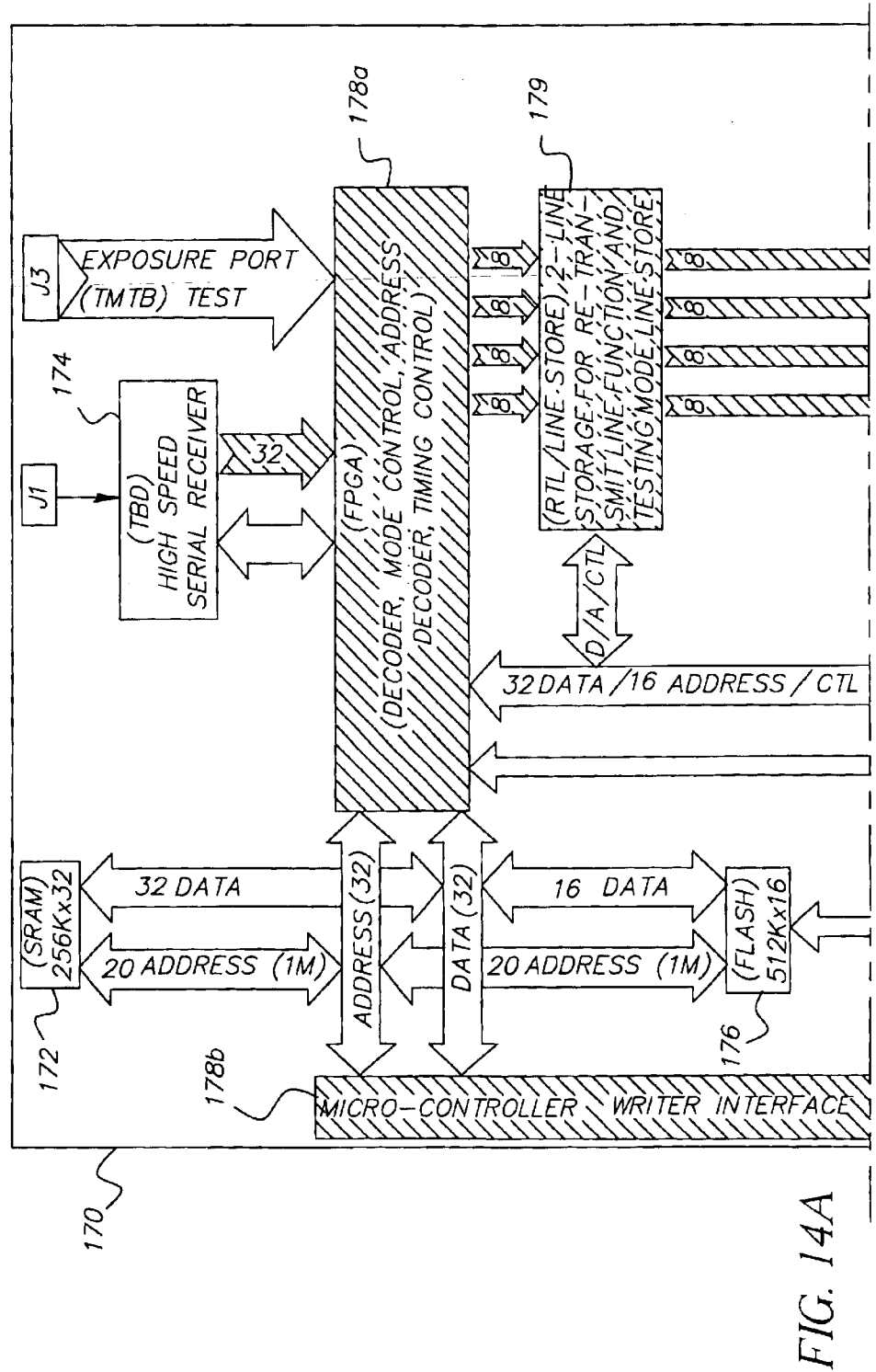
FIG. 14 is an interface board block diagram for the second preferred embodiment.
Figure 14B:
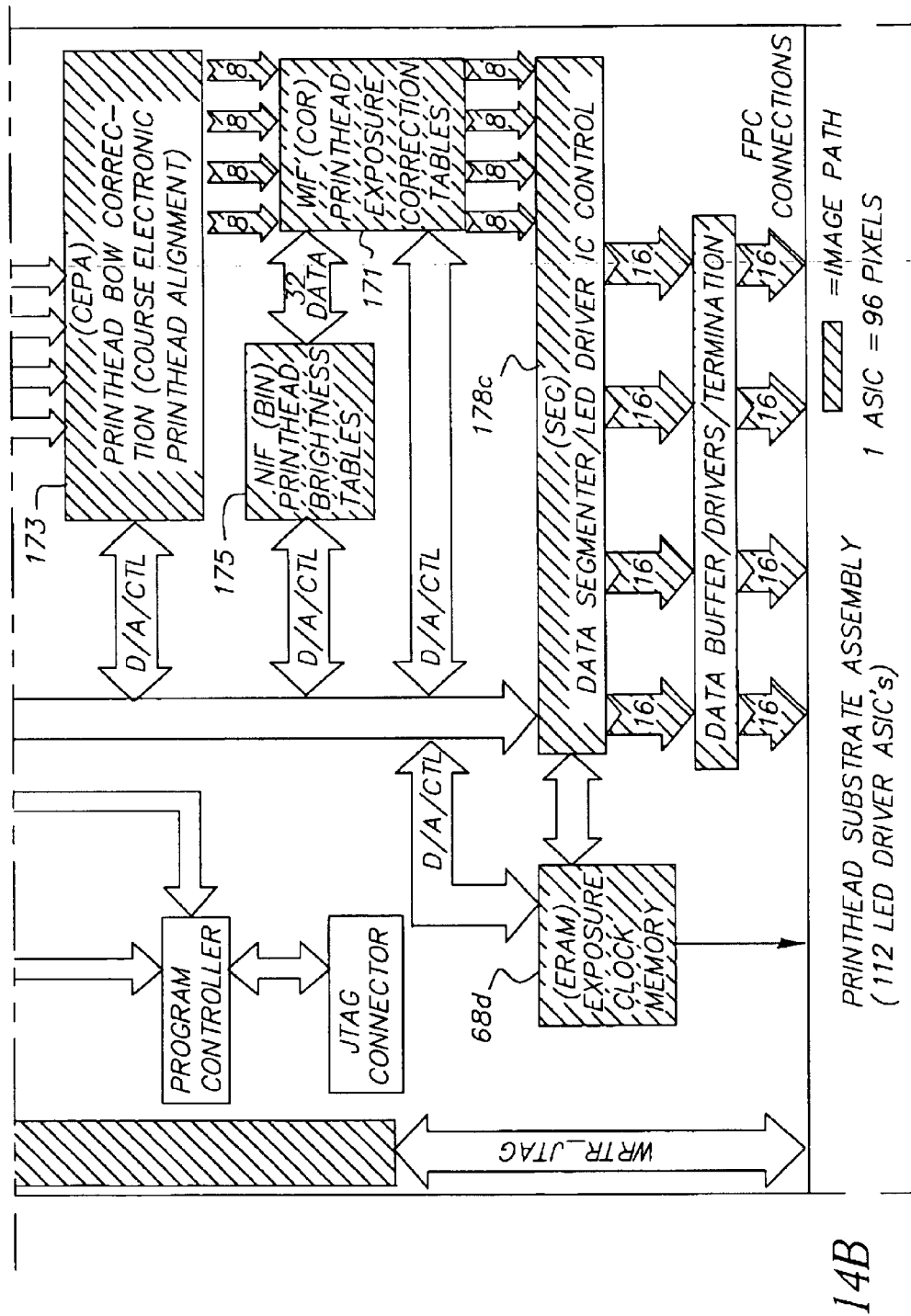

FIG. 14 is a block diagram illustrating the functions performed by the interface board 170 within the second preferred embodiment of the invention. In the second preferred embodiment, a larger FPGA is employed than in the first embodiment to enable the inclusion of several of the functions that were performed by discrete components in the first embodiment. Functions such as the CEPA function 173, the BIN tables 175 and even the writer interface microcontroller 178b are performed within the FPGA 178a. This is made possible by the ever higher integration of FPGA devices, as well the placement of memory facilities within these devices. As shown in FIG. 14B, the CEPA function 173 is performed on the interface board to the printhead using values stored for each of the LED elements. In this manner, the CEPA function can be applicable to any width exposure device and any element exposure device format, e.g. binary (on-off) or gray level (any bit size). Also CEPA is applicable for any element spacing (e.g., 300 dpi, 400 dpi, 600 dpi, 1200 dpi, . . . etc.). The hardware to implement the CEPA can be either directly on the interface-board 170 itself, or somewhere previously in the path of the image processing electronics. It can be performed in an ASIC or in an FPGA, or a combination of the two, or a similar technology device. In the second preferred embodiment, the FPGA 178a on the interface board contains most of the circuitry for the coarse correction, which is located on the interface board 170. The SRAM 172 is the working memory for the software used to perform necessary operations on the interface board 170 devices. The software needs such an area to perform operations to data and arrays of data. This memory is volatile, meaning it will lose its contents when power is removed. High Speed Serial Receiver 174 receives the high-speed image data from the output image path board (not shown). Flash 176 is a memory device used to store writer specific data. This memory is a non-volatile (NV) memory within the preferred embodiment (flash memory) in order to hold its contents when power is removed. The information held within Flash 176 is information such as printhead specific LUT (look up table) data, printhead calibration and scanning data, printhead specific CEPA/FEPA information and other data that is specific for that printhead. This data is determined initially and does not need to be determined again. Therefore, there is a substantial advantage to store this information locally. Local storage removes the need to store printhead specific files in another area, traditionally a hard drive in the main machine platform. Writer Interface Controller 178b is the brains of the interface board 170 and enables the printhead to perform all the necessary setup procedures without requiring assistance from another CPU or controller, which would traditionally be placed within the main machine platform. This provides a substantial advantage over the prior art, since all printhead operations are performed within the printhead itself, making the printhead very self-sufficient The implementation of Writer Interface Controller 178b can be by either using a discrete microcontroller, or modem FPGA architectures allow the placement of the entire Writer Interface Controller 178b within the FPGA 178a on the interface board 170. The new Re-Transmit Line (RTL) 179 feature will improve image quality. In the event of a transmission error in the high-speed serial image data path link, the RTL 179 feature will detect the error and discard all image line data and replace discarded data with the previous line of image data. The RTL 179 circuit will, thereby, prevent the corrupt image data from being exposed on the print. Data can occasionally become corrupted due to EMI, or ESD or power line surge type disturbances. The Correction Tables (COR) 171 in FIG. 14B provide writer correction features. However, the inclusion of the COR 171 tables on the interface board 170 is an advantage of the present invention. Typically, these tables are found earlier in the image processing path. Data segmenter/LED driver IC control (SEG) 178c formats and synchronizes the data appropriately to match the driver IC data bus. The Printhead brightness tables (BIN) 175 contain writer brightness correction feature in a manner that is known within the prior art. On the interface board 170, data flows through the CEPA 173 circuit in a manner similar to FIFO technology. CEPA 173 is one of many functions contained on the FPGA 178a. In FIG. 14B, the CEPA 173 is in series with the COR 171. The CEPA corrected image data then drives the COR LUT. All data sequentially flows through both CEPA 173 and the LUTs within COR 171. The BIN 175 tables run in parallel with the COR 171. The data from the BIN 175 drives one-half of the COR 171 by supplying input for LED specific brightness identification so that the appropriate COR correction is done. The corrected CEPA data drives the other half of the COR 171.

The CEPA 173 function, as shown in the preferred embodiment, is formed within FPGA 68a (FIG. 6) and is similar to FIFO based architecture. FPGA 178a enables this by providing both logical and memory elements to create a FIFO based circuit. It is also provided that an architecture could employ discreet FIFO components, as well as by implementing the CEPA 173 in custom VHDL code within FPGA 178a. Also CEPA 173 can be implemented with VHDL code in conjunction with SRAM memory device 172. Numerous other configurations will be apparent to those skilled within the art.

Figure 9A:
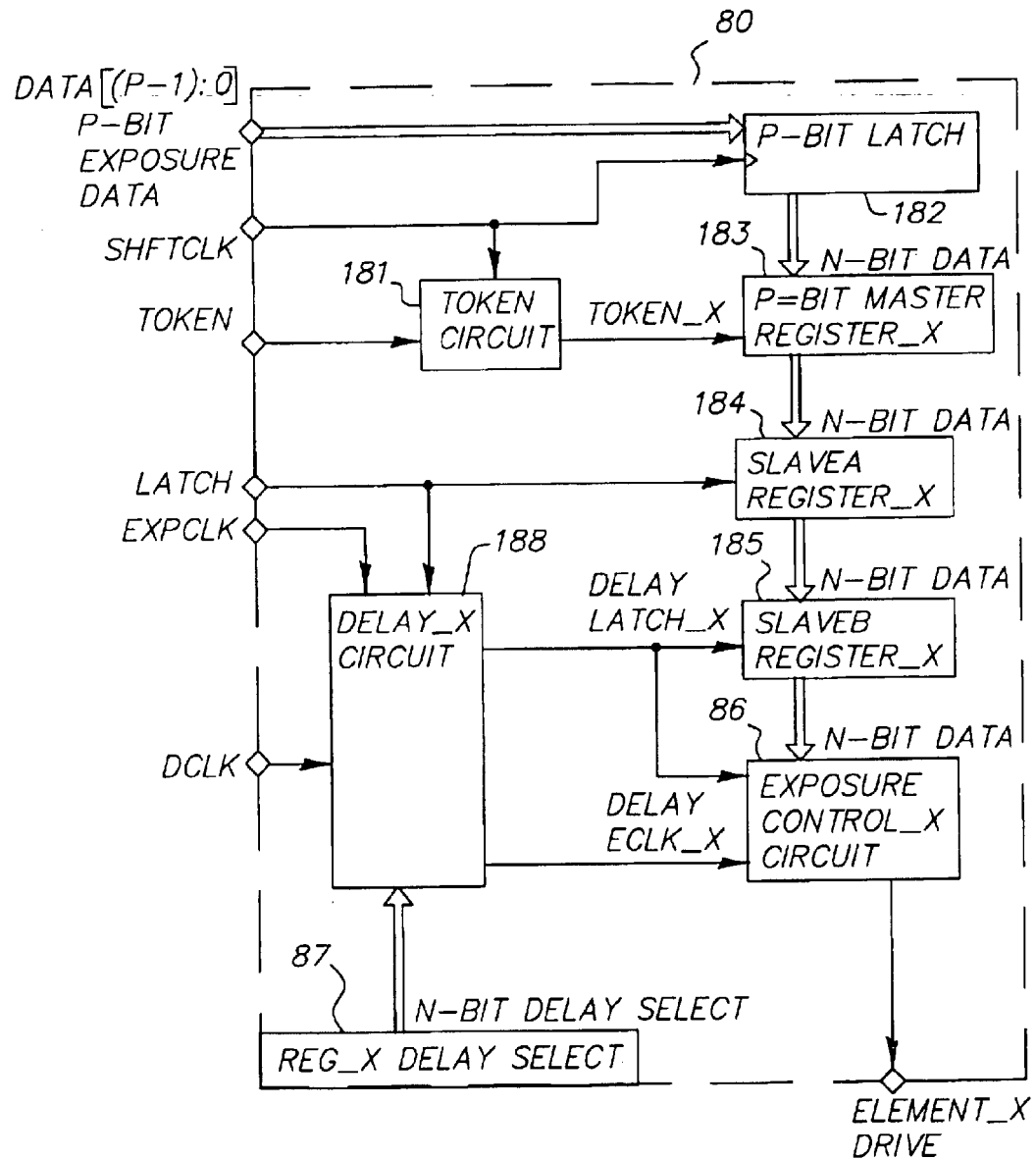
FIG. 9A is a block diagram of the fine adjustment electronics as envisioned by the second preferred embodiment of the invention.

Referring to FIG. 9A, a high level block diagram of the FEPA block diagram, as provided by the second preferred embodiment of the present invention, for a single LED element, can be broken into two basic areas. The first includes circuits that are associated with multiple LED elements. The second are those circuits that are associated with individual LED elements. The circuits and signal paths ending with "_x" indicate circuitry that is repeated for each LED element. Incoming exposure data gets stored in P-BIT LATCH 182 on the edges of ShiftClk. Each individual LED element has its exposure data from P-BIT LATCH 182 latched into an individual P-BIT MASTER REGISTER_X 183 on the edge of the TOKEN signal during data loading. All of the LED elements have data that is latched into their respective SLAVEA REGISTER_X 184 on the edge of the LATCH signal. Data from SLAVEA REGISTER_X 184 is latched into the SLAVEB REGISTER_X 185 on the edge of the delayed LATCH (DELAYLATCH_X) signal.

SHIFTCLK, Token and Latch are control timing signals for loading data to the writer driver ASICs The DELAYLATCH_X signal and a corresponding delayed ECLK (DELAYECLK_X) signal feed the exposure circuits simultaneously. The foregoing discussion relating to FIG. 9A pertains to a FEPA circuit for a signal LED element. The derivation of the DELAYLATCH_X signal and corresponding DELAYECLK_X signals shown in FIG. 9A are more clearly shown in FIGS. 9B and 12.

Figure 12:
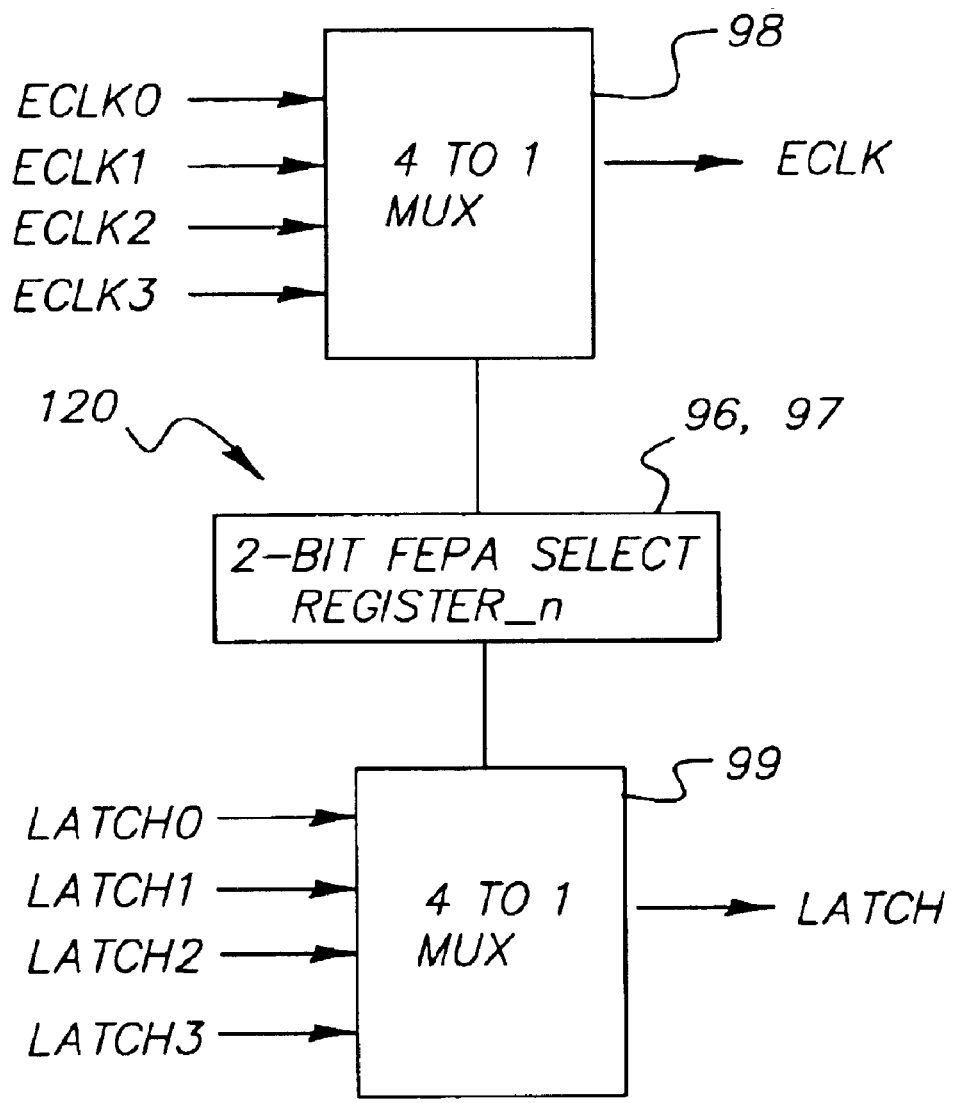
FIG. 12 is a detailed block diagram of the fine adjustment circuitry that is reproduced for each LED element.

FIG. 9B is a block diagram for the DELAY_X CIRCUIT 188 shown in FIG. 9A. As seen in FIG. 9B, up to n delays are available for fine adjustment of each of the LED drivers. The ECLKz (MASTER EXPOSURE CLOCK INPUT) 93 connects to one set of n DELAY CIRCUITS 92 and the SLAVEA LATCHz (MASTER LATCHz INPUT) 91 connects to another set of identical DELAY CIRCUITS 94. DELAY CIRCUITS 92, 94 then create n DELAYED ECLKS and n DELAYED LATCH signals then go to their respective (1of n) MUXs 98, 99 with their respective select registers 96, 97. There are two MUXs in the preferred embodiment as clearly seen in FIG. 12, where n is equal to three as a result of a 2-bit value used to represent n in the delay select register. The software accessible register (one for each element) selects which n delay value (# of DCLK delays) of the incoming ECLKz to use and also the corresponding delayed LATCHz signal to use for that specific element. As provided by the preferred embodiment of the present invention, each LED driver will have the circuit as shown in FIG. 12, which will select one of the delays as the DELAYEDLATCH_X or DELAYECLK_X signal shown in FIG. 9A.

Figure 10A:
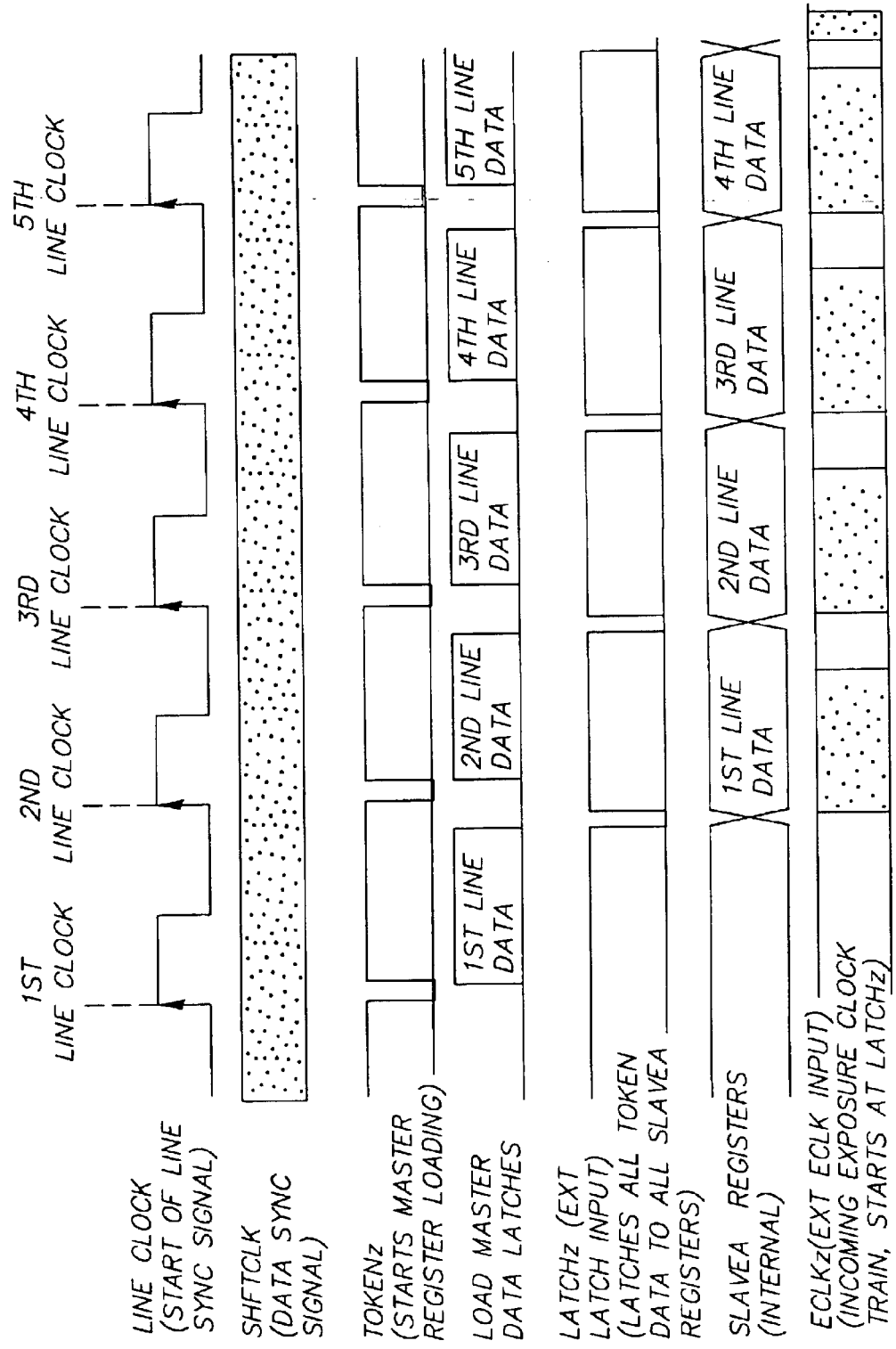
FIG. 10 is a fine adjustment timing diagram for the circuitry shown in FIGS. 9A and 9B.
Figure 10B:
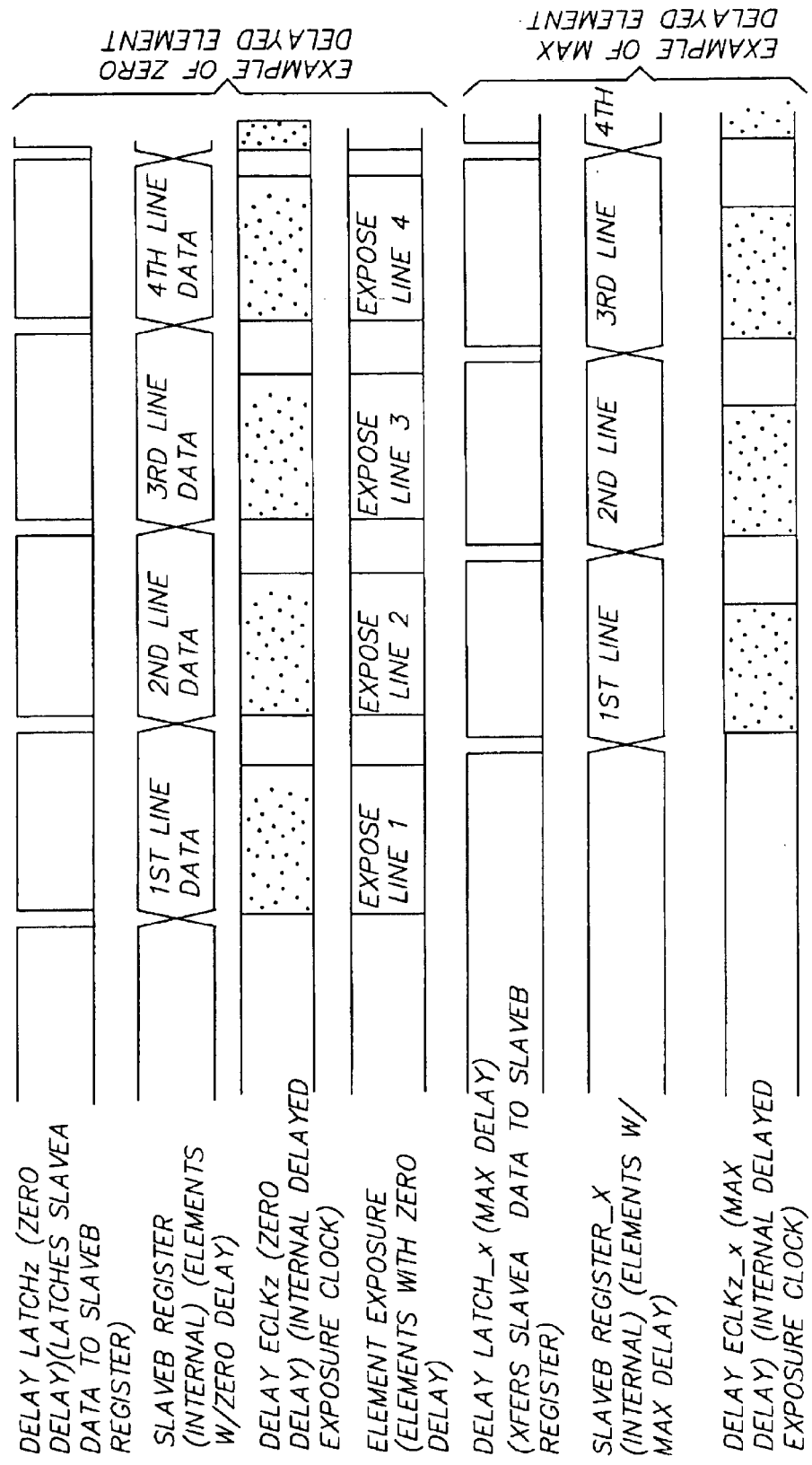

FIG. 10 (10A, 10B) is a signal timing diagram for the FEPA circuit as seen in FIG. 9A. The falling edge of TOKENz begins element data loading to the element token master registers on the edges of TOKEN_X signals. Falling edge of LATCHz transfers master register data to ALL SLAVEA registers simultaneously (each element contains a unique SLAVEA). Master ECLKz and master LATCHz each feed an n-delay block. The n-bit software accessible registers (one per element) determine which n value of delayed ECLKz/LATCHz signals to use for each element. The falling edge of DELAYLATCHz (the delayed LATCHz signal) transfers the SLAVEA data to the SLAVEB register and also resets the exposure circuit. NOTE: The first falling edge of the delayed exposure clock train (DELAYECLKz) begins the exposure circuit of the element.

It is also provided that it is desirable to reduce the total number of interconnects that are required by the system to implement the FEPA function, which is the approach employed by the second preferred embodiment of the invention. Reducing the number of interconnects is important because the spatial configurations of printheads are constantly being more rigidly defined with increased demands for higher resolution and quality. Signal paths on a printhead take space and, generally, must run to many of, if not all, the driver circuits servicing each of the LED elements. Reducing the number of signal paths required results in a more economically manufactured device. This is accomplished within the present invention by the FEPA being made in conjunction with the CEPA. The FEPA, detailed herein, provides n unique selectable delay clock cycles derived from the incoming exposure clock signal and provides n unique selectable latch signals from the incoming line latch signal. The present invention specifically provides that the FEPA be adjustable to virtually any resolution simply by changing the bit depth n. Both the ECLK and the DCLK are derived from the same high-frequency clock, and they are synchronized with one another. ECLK and DCLK, within the preferred embodiment, are based on a 30 MHz clock. DCLK is 30 MHz, and ECLK is 30 MHz or less, as it changes throughout the exposure cycle within a given line.

In order for the FEPA to be effective, it is necessary that each LED element have a data exposure start time that can be delayed in fractions of whole line increment to allow for a fine spacing adjustment of the placement of LED elements during exposure. The Delay Clock (DCLK) is a fixed clock reference for the unique fixed delays. This clock frequency can be changed to produce any desired delay increments.

Note that in FIG. 7b, T=1 DCLK DELAY. In the preferred embodiment there are four delays; i.e., delays 0, 1, 2, and 3. However, it is also provided that many more delays could be employed within a FEPA circuit by allowing more bits to be employed within the delay circuit that create the delay clocks. The n-bit software accessible register would also have to increase in size because the more delays desired, the larger value for n that must be employed to achieve 1 of n delay selection for each LED element. This register can be loaded with the input data bus path. This register can be JTAG compatible for testability reasons, which would also allow this register to be loaded from the JTAG serial data path.

The FEPA is applicable to any width of LED elements used as the exposure device. Furthermore the FEPA of the present invention, is applicable to any element exposure device format, e.g., binary (on-off) or gray level (any bit size), and it is also applicable for any element spacing (e.g., 300 dpi, 400 dpi, 600 dpi, 1200 dpi, . . . etc.)

Figure 11:
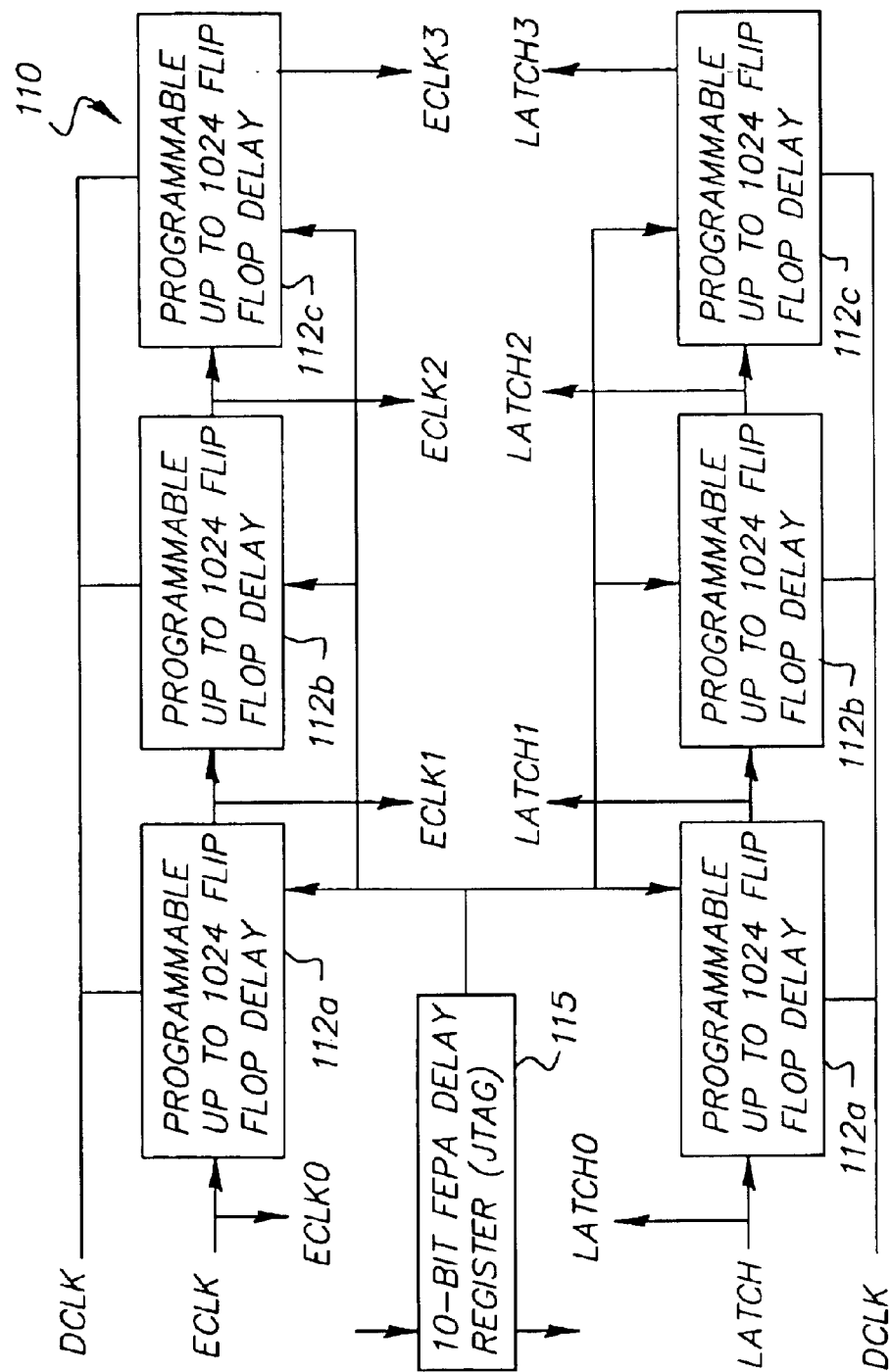
FIG. 11 is a block diagram of the fine adjustment circuitry employed per driver.

FIG. 11 is a block diagram of the FEPA circuitry per LED 110 that is employed by the second embodiment of the present invention for every LED element. In the second preferred embodiment, each driver provides the circuitry required for ninety-six LED elements, and there are one hundred twelve drivers or ASICs' total within the preferred embodiment. In the preferred embodiment, each ASIC driver will provide the FEPA circuitry necessary to uniquely control the exposure periods for each of the ninety-six LED elements. In FIG. 11, each the ECLK and the LATCH signals will traverse three delay circuits one hundred twelve that include, within the preferred embodiment, three separate delay blocks 112a, 112b, 112c. This produces three delayed versions of the ECLK and LATCH. This results in four possible choices of each: 1) no delay; 2) 25% line delay; 3) 50% line delay; or 4) 75% line delay. The 2-bit FEPA select registers (one per LED) are to be used to select one of the four possible choices of delay. A scan operation will be performed to an assembled printhead to determine the sub-pixel delay required by each element. The 10-bit FEPA delay register is used to control each delay block to be approximately 25% of the process line time. By making this register a JTAG accessible register, the delay times can be adjusted to match any process print speed.

Still referring to FIG. 11, the second preferred embodiment provides each the ECLK and LATCH signals with three delay circuits 112a, 112b, and 112c, yielding four versions of each signal that are time offset by 25%. However, in a manner similar to that described in the first embodiment, by increasing the clocking frequency used for the flip-flops in delay circuits 112a, 112b, and 112c, the delay circuits could regenerate additional delays such that the first delay circuit 112a would also serve as the fourth delay circuit 112a, the seventh delay circuit 112a and so on. The second delay circuit 112b would also serve as the fifth delay circuit 112b, the eighth delay circuit 112b and the third delay circuit 112c could be used as the sixth delay circuit 112c and the ninth delay circuit 112c. Here, select) and select2 signals would control which delayed signal is used. The 11-bit FEPA delay register could control the number of clocks in each of the delay circuits 112a, 112b, and 112c. The amount of resolution could be increased from 25% (¼) of a line to 17.5% (1/7) of a line and even further to 10% (1/10) of a line. Additionally, it is provided that instead of employing three delay circuits 112a, 112b, and 112c for each of the ECLK and LATCH signals, that only two delay circuits be employed and reused, as discussed above, would yield a FEPA resolution of 20% (⅕) of a line employing an arrangement requiring less circuitry and that also could provide delays that can be reused to provide additional delays.

FIG. 12 is a detailed block diagram of the per LED element FEPA circuitry 120 that is used to adjust the pixel data such that the output from the LED elements is linear to the extent of a fractional portion of a single line. Multiplexers 98, 99 are shown (as in FIG. 9 but in greater detail). Clearly evident in FIG. 12 is the fact that select registers 96, 97 can be a single register, as is the case for the preferred embodiment. While the select registers 96, 97 contain 2 bits, as shown here, the select registers 96, 97 and the multiplexers 98, 99 can be configured to accommodate many more delays in other embodiments.

The present invention differs from the approach taken within U.S. Pat. No. 5,585,836, because U.S. Pat. No. 5,585,836 requires two exposure CLK inputs (goes from 1 to 3) and also adds one latch input (goes from 1 to 2), therefore requiring three total pins per driver IC. The FEPA of the present invention uses only one DCLK pin per driver. To create a printhead with the same LED elements, the approach taken in U.S. Pat. No. 5,585,836 would require three circuits paths x one hundred twelve IC's or three hundred thirty-six circuit paths and a respective three hundred thirty-six wire bonds. The present invention requires one hundred twelve of these circuit paths and wire bonds yielding a reduction of two hundred twenty-four circuit paths with an associated two hundred twenty-four wire bonds. The present invention still requires a comparator, but only one and not three per LED, as in U.S. Pat. No. 5,585,836. The present invention still requires a MUX, however, only one per LED.

In order to implement FEPA, the present invention requires one set of time delays (for the Master exposure clock and latch timed by the Delay reference clock) per driver, and an n-bit latch and multiplexer per element if FEPA is implemented in the per LED element. This results in a significant spatial advantage, requiring a set of comparators (one per delay exposure clock set) and a multiplexer and latch per clement. If the present invention is implemented, the electronic bow correction at a segment level (such as groups of 2, 4, 8, 16 elements), then the present invention would only require the time delay per driver; a register; and a multiplexer per segment, resulting in additional savings in IC Driver cost. Similar methodology can be employed for FEPA at the per driver basis as well, so the exposure does not have to be centered the same way on a per driver basis to correct for bow. This approach can also be used in binary printing as well as multi-level printing as shown herein.

The present invention describes a printhead for electrophotographic printing wherein LEDs are driven from odd and even sides simultaneously. In FIG. 7, there are eight elements shown. Provided the leftmost element is element number 1, then the rightmost element is element number 8, and the even elements are driven by an even side IC driver and the odd elements are driven by an odd side IC driver. In this embodiment a row of LED's is comprised of a row of even LED's and a row of odd LED's. Both the odd and even elements are exposed in parallel. The FEPA architecture of the present invention can take great advantage of this architecture to a half-level fine correction control. By employing FEPA at the driver basis and using, for example, a two bit (0T to 3T) selectable delay, the odd pixels can be electronically positioned relative to the even pixels in steps of 0T to 3T. In previous discussions herein, the positioning of the even and odd pixels occurred at the segment level (such as groups of two, four eight, and sixteen). By employing FEPA at the driver basis, there is now relative separation between the even and odd pixels. By adjusting the delays such that the electronic positioning of the odd and even pixels are one arranged offset above or below the other, a level of adjustment that yields an appearance of substantially higher resolution is achieved. That is a half-level or a level that is in-between the ¼ increments can be achieved by offsetting the odd and even pixels with respect to each other. This effectively provides twice as many FEPA correction levels of observable shift, which will further improve image quality.

In either the first or second preferred embodiments previously discussed, and also any embodiments that use multiple rows of LEDs, the offsetting of pixels in various rows by a different amount of delay can result in an appearance that is somewhere in-between delays, as if there were more delays or delays that are fractionally smaller. FIG. 13A is a diagram illustrating the odd and even pixel that is ideally shifted by the same amount in a perfect line.

FIG. 13B is a diagram illustrating the offsetting of odd pixels by shifting the odd pixels by ¼ of a line and not shifting the even pixels, resulting in the appearance of a system capable of shifting pixels ⅛ of a line. Note that the appearance sought is that illustrated in FIG. 13A.

FIG. 13C is a diagram similar to that of FIG. 13B illustrating only the even pixels being shifted by ¼ of a line and odd pixels not shifted, resulting in the appearance of a system capable of shifting pixels ⅛ of a line. Note, once again, that the appearance sought is that illustrated in FIG. 13A.

The foregoing description details the best mode known for practicing the invention. Variations will be readily apparent to those skilled in the art. Therefore, the scope of the invention should be measured by the appended claims.

| Parts List | |
|---|---|
| 1 | WRITER |
| 4 | INTERFACE BOARD |
| 7 | SUBSTRATE ASSEMBLY |
| 12 | BOW EFFECT |
| 14 | EXPOSURE PLANE |
| 22 | BOW EFFECTS |
| 24 | EXPOSURE PLANE |
| 32 | LED ELEMENTS |
| 33 | CORRECTED PIXELS |
| 49 | CEPA DATA LINE |
| 50 | CEPA DATA LINE |
| 51 | CEPA DATA LINE |
| 52 | CEPA DATA LINE |
| 53 | CEPA DATA LINE |
| 60 | INTERFACE BOARD |
| 61 | CORRECTION TABLES |
| 62 | SRAM |
| 63 | COURSE ELECTRONIC PRINTHEAD ALIGNMENT (CEPA) |
| 64 | HIGH SPEED SERIAL RECEIVER |
| 65 | BIN TABLES |
| 66 | (SYNC FLASH) OFFLINE STORED IMAGES |
| 68 | FPGA |
| 68a | WRITER INTERFACE CONTROLLER |
| 68b | WRITER INTERFACE CONTROLLER |
| 68c | SEGMENTER/LED DRIVER CONTROL |
| 69 | RE-TRANSMIT LINE FEATURE (RTL) |
| 70 | SWITCH CIRCUITS |
| 72 | FINAL PIXELS |
| 73 | PIXEL |
| 75 | SEGMENT BLOCK |
| 76 | FEPA REGISTER |
| 77a | SWITCH BLOCK |
| 77b | SWITCH BLOCK |
| 77c | SWITCH BLOCK |
| 77d | SWITCH BLOCK |
| 78a | MULTIPLEXER |
| 78b | MULTIPLEXER |
| 79 | UP/DOWN COUNTER |
| 80 | LED BLOCK |
| 82 | P-BIT LATCH |
| 83 | P-BIT MASTER REGISTER |
| 84 | SLAVEA REGISTER_X |
| 85 | SLAVEB REGISTER_X |
| 86 | EXPOSURE CIRCUIT_X (COMPARATOR/FLIP-FLOP PER LED) |
| 92 | DELAY CIRCUIT |
| 93 | ECLKz SIGNAL (MASTER EXPOSURE CLOCK INPUT) |
| 94 | DELAY CIRCUIT |
| 95 | SELECT REGISTER |
| 96 | N-BIT SELECT REG1 |
| 97 | DCLK (DELAY REFERENCE CLOCK) |
| 98 | MULTIPLEXER |
| 99 | MULTIPLEXER |
| 110 | FEPA CIRCUITRY PER LED |
| 112a | DELAY CIRCUIT |
| 112b | DELAY CIRCUIT |
| 112c | DELAY CIRCUIT |
| 115 | 10-BIT FEPA DELAY REGISTER (JTAG) |
| 120 | FEPA CIRCUITRY |
| 130 | SUBSTRATE BOARD |
| 160 | FEPA DELAY BLOCK |
| 162a | DELAY CIRCUIT |
| 162b | DELAY CIRCUIT |
| 162c | DELAY CIRCUIT |
| 165 | BINCOR |
| 168a | MULTIPLEXER |
| 168b | MULTIPLEXER |
| 170 | INTERFACE BOARD |
| 171 | WIF (COR) PRINTHEAD EXPOSURE CORRECTION TABLES |
| 172 | SRAM |
| 173 | CEPA PRINTHEAD BOW CORRECTION (COARSE ELECTRONIC PRINTHEAD ALIGNMENT) |
| 174 | HIGH SPEED SERIAL RECEIVER |
| 175 | NIF (BIN) PRINTHEAD BRIGHTNESS TABLES |
| 176 | FLASH |
| 178a | FPGA (DECODER, MODE CONTROL, ADDRESS DECODER, TIMING CONTROL) |
| 178b | MICRO-CONTROLLER WRITER INTERFACE |
| 178c | (SEG) DATA SEGMENTER/LED DRIVER IC CONTROL |
| 179 | (RTL/LINE STORE) 2 LINE STORAGE FOR RE-TRANSMIT LINE FUNCTION AND TESTING MODE LINE STORE |
| 182 | P-BIT LATCH |
| 183 | P-BIT MASTER REGISTER |
| 184 | SLAVEA REGISTER_X |
| 185 | SLAVEB REGISTER_X |
| 188 | DELAY CIRCUIT |

What is claimed is:

1. A printhead circuit for correcting bow in a linear arrangement of elements comprising:

a substrate assembly for an image exposure line arrangement of a printer, a plurality of LED elements representing said image exposure line arrangement, each LED element having an associated driver subassembly on said substrate assembly and, each of said LED elements representing a pixel within an image exposure line;

an interface board coupled to said substrate assembly, said interface board having circuitry that processes image exposure data for said LED elements;

a course bow correction circuit on said interface board that electronically arranges the pixels generated by said LEDs to improve linearity by integral numbers of pixel pitches; and a fine bow correction circuit located at least partially on said substrate assembly, said fine bow correction circuit providing a first circuit common to a plurality of said LED elements and a second circuit dedicated to a specific LED element, said second circuit selecting one of a set of delays in activating said LED such that linearity of the pixels within an image exposure line is improved by a fraction of a pixel pitch.

2. The printhead circuit of claim 1, wherein said fine bow correction circuit is located at least partially on said interface board.

3. The printhead circuit of claim 2, wherein said fine bow correction circuit that is located at least partially on said interface board provides at least one circuit trace that carries a plurality of signals to said fine bow correction circuit on said substrate assembly, wherein the signals are not concurrently active.

4. The printhead circuit of claim 1, wherein with said fine bow correction, said first circuit provides said set of delays for said plurality of LED elements; and said second circuit selects one of the delays from said set of delays according to a specific parameter for said specific LED element.

5. The printhead circuit of claim 4, wherein said parameter further comprises a stored value that enables said second circuit to select one of the delays from said set of delays.

6. The printhead circuit of claim 5, wherein said stored value is within said fine bow correction circuit, and said fine bow correction circuit further comprises at least one multiplexer and at least one latch per LED element.

7. The printhead circuit of claim 1, further comprising a delay repeat circuit that creates multiples of said set of delays using said set of delays.

8. The printhead circuit of claim 1, wherein said fine bow correction circuit is implemented at a segment level selected from one of the following LED segment level groupings: 2, 4, 8, or 16 LED elements.

9. The printhead circuit of claim 1, wherein said interface board further comprises a set of printhead brightness tables and a set of printhead correction tables on said interface board.

10. The printhead circuit of claim 1, wherein said LED elements are arranged in a plurality of rows and wherein said second circuit selects different delays, from said set of delays, for different rows of LED elements.

11. The printhead of claim 10, wherein said plurality of rows of LED elements further comprises an odd row and an even row, and said second circuit selects delays that are offset by a period substantially equal to a selected delay, between an odd row and an even row.

12. A method for producing an electronic printhead, having pixel alignment circuitry, by the steps of:

providing a substrate having a plurality of printing elements representing an image exposure line, with associated driver circuitry, coupled to an interface board, and timing means for selectively activating said printing elements for exposing an image exposure line, one at a time, for a preselected exposure period, each of said printing elements representing a pixel within an image exposure line;

creating a coarse adjustment circuit on said interface board, said coarse adjustment circuit having circuitry that aligns image exposure line pixel data in integral numbers of lines;

forming a fine adjustment circuit located at least partially on said substrate, said fine adjustment circuit providing a plurality of delays to each of said printing elements, wherein each of said delays is a fraction of an exposure period of said timing means corresponding to a fraction of a pixel pitch, and wherein a software accessible register can be loaded via a JTAG serial data path; and selecting one of the delays in accordance with a predetermined parameter.

13. The method of claim 12, wherein the step of forming further comprises forming the fine adjustment circuit wherein a delay clock having a fixed clock reference for unique fixed delays has a frequency that can be changed to produce different delay increments.

14. The method of claim 12, wherein said step of forming said fine adjustment circuit, forms a fine bow correction circuit located at least partially on said interface board, and provides at least one circuit trace that carries a plurality of signals to said fine bow correction circuit on said substrate, wherein said signals are not concurrently active.

15. The method of claim 12, wherein said step of providing further comprises providing said printing elements arranged in a plurality of rows, and wherein said fine adjustment circuit selects different delays for different rows of said printing elements.

16. The method of claim 15, wherein said step of providing further comprises providing as said plurality of rows, an odd row and an even row, and said fine adjustment circuit selects delays that are offset by one delay period between an odd row and an even row.

* * * * *